US011609109B2

(12) United States Patent
Guerra et al.

(10) Patent No.: US 11,609,109 B2
(45) Date of Patent: Mar. 21, 2023

(54) FLOW SENSOR FOR SENSOR NETWORK IN CONTROLLED ENVIRONMENT AGRICULTURE

(71) Applicant: MJNN LLC, South San Francisco, CA (US)

(72) Inventors: Paul Guerra, Redwood City, CA (US); Nicholas Kalayjian, San Carlos, CA (US)

(73) Assignee: MJNN LLC, South San Francisco, CA (US)

(*) Notice: Subject to any disclaimer, the term of this patent is extended or adjusted under 35 U.S.C. 154(b) by 0 days.

(21) Appl. No.: 17/391,464

(22) Filed: Aug. 2, 2021

(65) Prior Publication Data
US 2022/0042837 A1 Feb. 10, 2022

Related U.S. Application Data

(60) Provisional application No. 63/061,439, filed on Aug. 5, 2020.

(51) Int. Cl.
*G01F 1/684* (2006.01)
*G01F 1/696* (2006.01)
(Continued)

(52) U.S. Cl.
CPC .............. *G01F 1/684* (2013.01); *G01F 1/688* (2013.01); *G01F 1/696* (2013.01); *A01G 9/247* (2013.01)

(58) Field of Classification Search
CPC .......... G01F 1/684; G01F 1/688; G01F 1/696; A01G 9/247
See application file for complete search history.

(56) References Cited

U.S. PATENT DOCUMENTS 4,043,195 A * 8/1977 Hunting .................. G01F 1/684 73/204.14
7,624,632 B1 * 12/2009 Hoyle ................... G01F 1/6847 73/204.11
(Continued)

FOREIGN PATENT DOCUMENTS

CN 202101774 U * 1/2012
CN 103488211 A * 1/2014
(Continued)

OTHER PUBLICATIONS

Last Minute Engineers, Interfacing Multiple DS18B20 Digital Temperature Sensors with Arduino, https://lastminuteengineers.com/multiple-ds18b20-arduino-tutorial/, Published Jul. 12, 2019 (sourced via www.waybackmachine.com) (Year: 2019).*
(Continued)

Primary Examiner — Ryan D Walsh
(74) Attorney, Agent, or Firm — Almanac IP Advisors LLP

(57) ABSTRACT

Systems, methods and computer-readable media are provided for fluid flow measurement in a controlled agricultural environment. A digital flow sensor comprises a flow sensor element including a first digital thermometer for providing a first output and a heating element thermally coupled to the first digital thermometer. The flow sensor may also include a second digital thermometer for providing a second output, and logic for providing a flow measurement based at least in part upon the first and second outputs. A flow sensor network may include multiple digital flow sensors, where data lines of the flow sensors are all coupled to the same network bus for communicating data.

31 Claims, 23 Drawing Sheets

(51) Int. Cl.
*G01F 1/688* (2006.01)
*A01G 9/24* (2006.01)

(56) References Cited

U.S. PATENT DOCUMENTS

| | | | |
|---|---|---|---|
| 7,752,909 B2 * | 7/2010 | Kamiunten | G01F 1/6847 |
| | | | 73/204.23 |
| 8,327,582 B2 | 12/2012 | Storey | |
| 10,701,875 B2 | 7/2020 | Klein et al. | |
| 2009/0025473 A1 * | 1/2009 | Imai | G01P 5/18 |
| | | | 73/204.14 |
| 2016/0187174 A1 * | 6/2016 | Kharsa | F17D 5/005 |
| | | | 73/204.25 |
| 2016/0327420 A1 * | 11/2016 | Martin | G01F 1/684 |
| 2017/0146226 A1 | 5/2017 | Storey et al. | |
| 2018/0014485 A1 | 1/2018 | Whitcher et al. | |
| 2018/0014486 A1 | 1/2018 | Creechley et al. | |
| 2018/0306618 A1 * | 10/2018 | Han | G01F 1/684 |

FOREIGN PATENT DOCUMENTS

| | | | | |
|---|---|---|---|---|
| CN | 203408303 U | * | 1/2014 | |
| CN | 104236652 A | * | 12/2014 | G01F 1/684 |
| CN | 204512965 U | * | 7/2015 | |
| CN | 111214725 A | * | 6/2020 | |
| DE | 102009029169 A1 | * | 3/2011 | G01F 1/3245 |
| JP | 2007225440 A | * | 9/2007 | |
| WO | WO-2019034846 A1 | * | 2/2019 | G01F 1/05 |
| WO | WO-2019198335 A1 | * | 10/2019 | G01F 1/692 |

OTHER PUBLICATIONS

Application Note 1753, A Simple Thermistor Interface to an ADC, Nov. 26, 2002, Maxim Integrated Products, Inc., 3 pages.

Dantec Dynamics, Constant Temperature Anemometry, A Theoretical Introduction by Dr. F. Gökhan Ergin, Aug. 10, 2022, 43 pages.

Dantec Dynamics, Flow Field Diagnostics, Constant Temperature Anemometry Solutions, Publication No. 346 v1, 8 pages.

Dantec Dynamics, Measurement Principles of CTA, Precision Measurement Systems & Sensors, available at https://www.dantecdynamics.com/solutions-applications/solutions/fluid-mechanics/constant-temperature-anemometry-cta/measurement-principles-of-cta/, retrieved on May 25, 2020, 3 pages.

DS18B20 Programmable Resolution I-WIRE Digital Thermometer Datasheet, 19-7487; Rev 6; Jul. 2019, Maxim Integrated Products, Inc., 20 pages.

KEYENCE America, Clamp-On Liquid Flow Meter, available at https://www.keyence.com/landing/lpc/liquid-flow-meter.jsp, retrieved on May 25, 2020, 4 pages.

Pani: Smart Home Water Monitoring, Water conservation, available at https://getpani.com, retrieved on May 25, 2020, 5 pages.

* cited by examiner

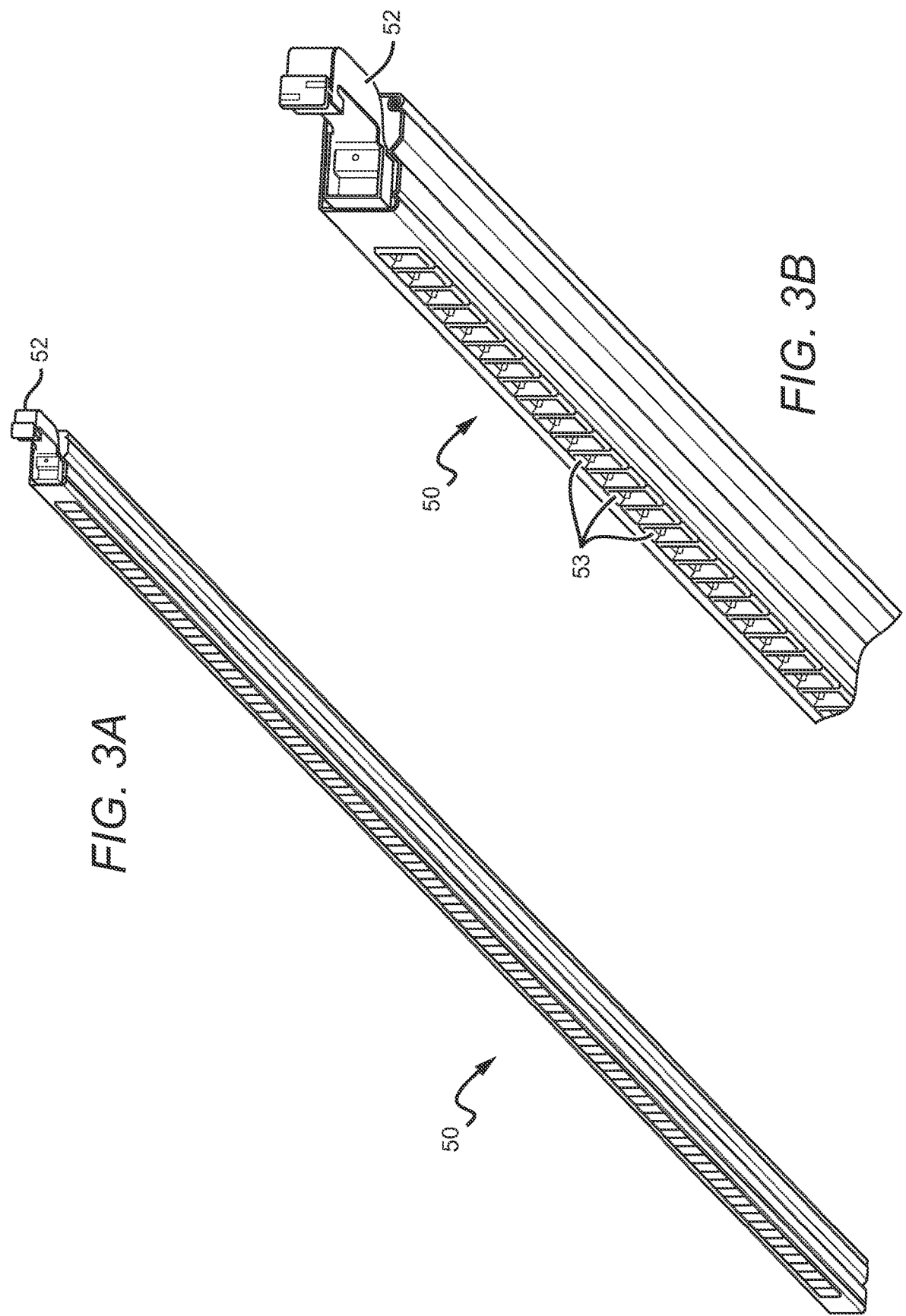

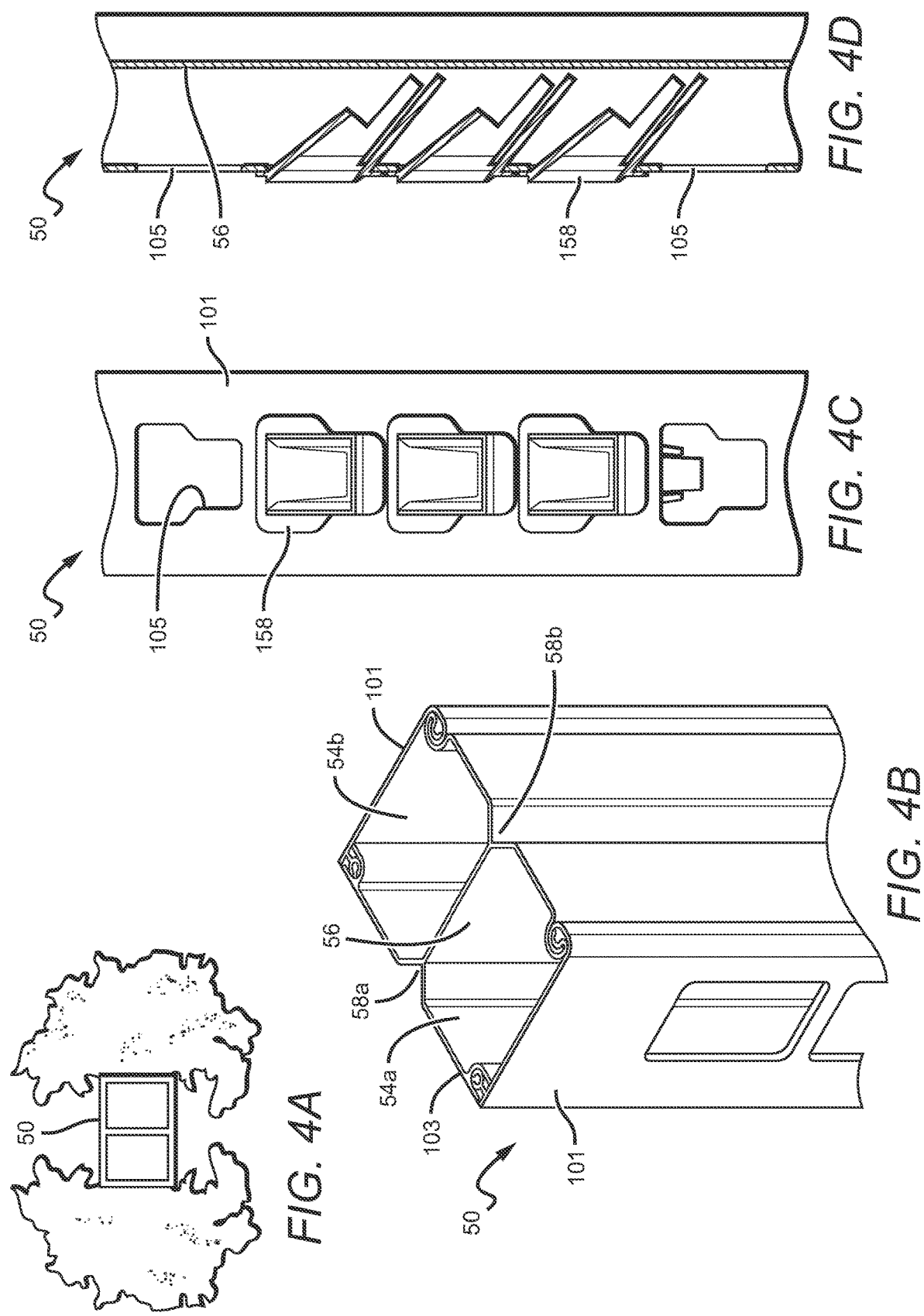

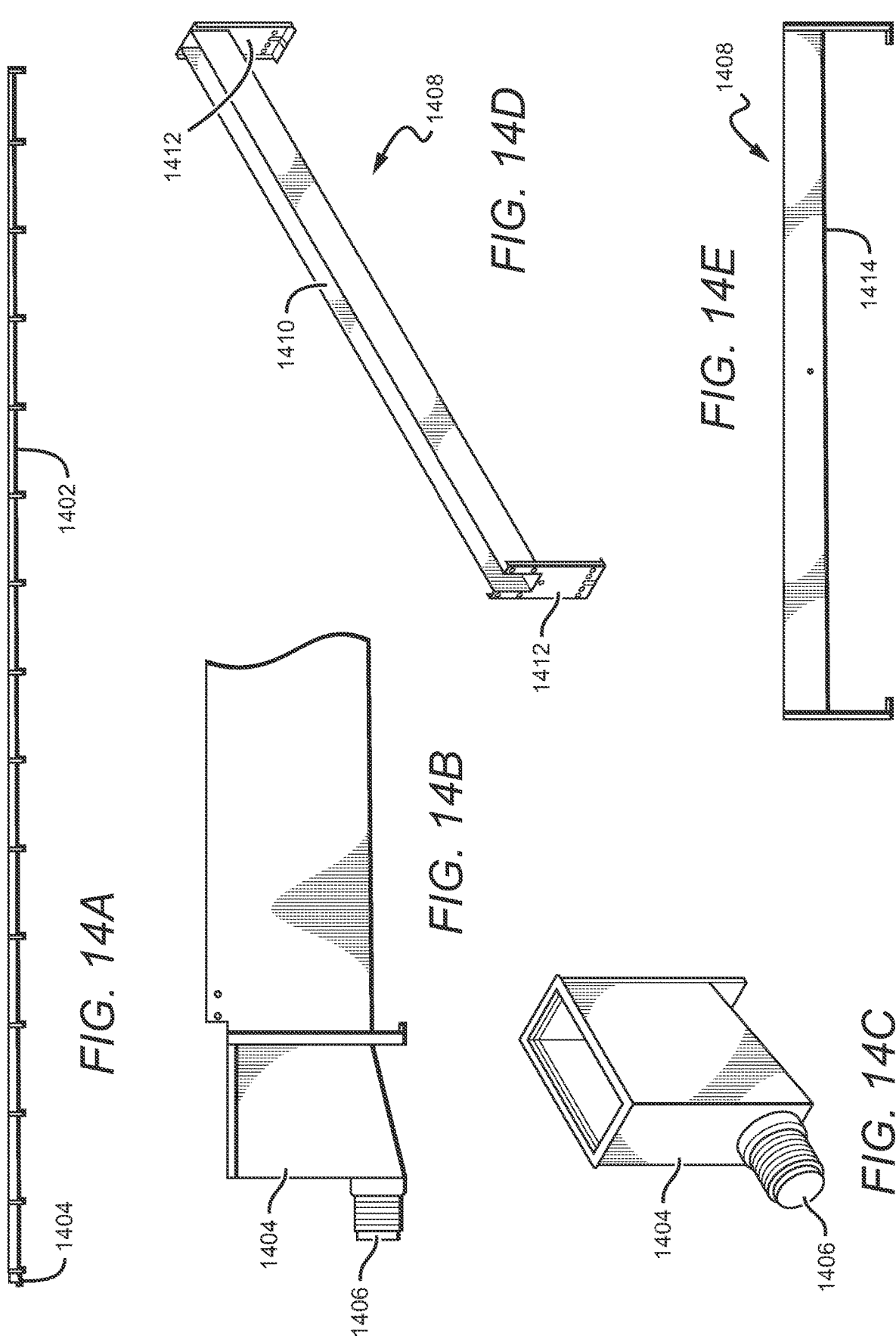

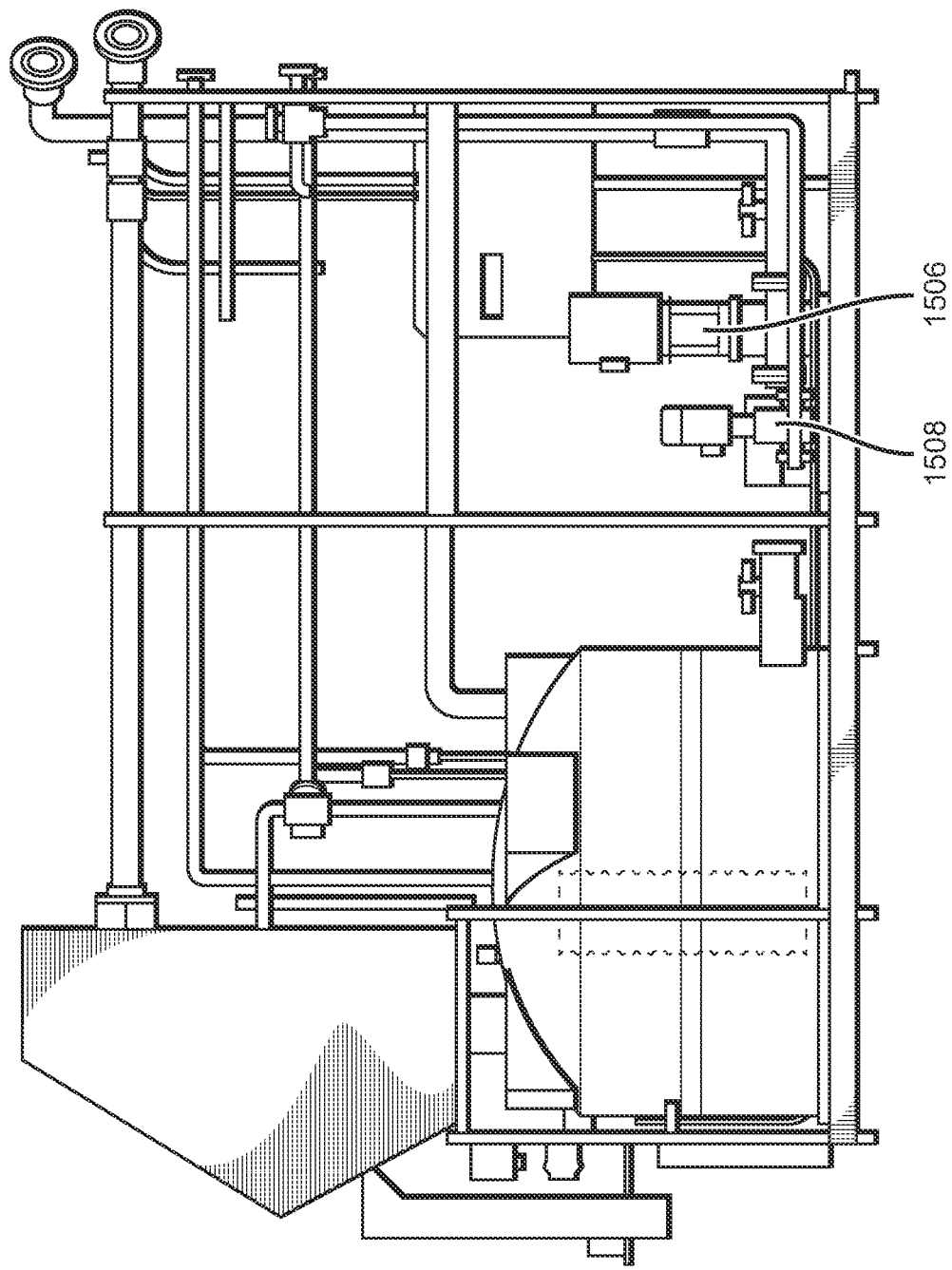

FLOW SENSOR FOR SENSOR NETWORK IN CONTROLLED ENVIRONMENT AGRICULTURE

CROSS-REFERENCE TO RELATED APPLICATIONS

This application claims the benefit of priority of U.S. Provisional Application No. 63/061,439, filed 5 Aug. 2021, and incorporated by reference in its entirety herein.

BACKGROUND

Field of the Disclosure

The disclosure relates generally to the field of agriculture, and in particular to a flow sensor adapted for use in a sensor network in a controlled agricultural environment.

Description of the Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

During the twentieth century, agriculture slowly began to evolve from a conservative industry to a fast-moving high-tech industry in order to keep up with world food shortages, climate change, and societal changes. Farming began to move away from manually-implemented agricultural techniques toward computer-implemented technologies. Conventionally, farmers only have one growing season to produce the crops that would determine their revenue and food production for the entire year. However, this is changing. With indoor growing as an option, and with better access to data processing technologies and other advanced techniques, the science of agriculture has become more agile. It is adapting and learning as new data is collected and insights are generated.

Advancements in technology are making it feasible to control the effects of nature with the advent of "controlled indoor agriculture," otherwise known as "controlled environment agriculture" or "CEA." Similarly, as to terminology this disclosure concerns embodiments of a controlled agricultural environment ("CAE"), such as an indoor farm. Improved efficiencies in space utilization and lighting, a better understanding of hydroponics, aeroponics, and crop cycles, and advancements in environmental control systems have allowed humans to better recreate environments conducive for agriculture crop growth with the goals of greater harvest weight yield per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

For an indoor farm, ideally optimum growth conditions are determined for the plants and the HVAC system is adjusted to obtain those optimum growth conditions. Of course, for a particular crop the optimum growth conditions are usually those desired for an indoor farm. However, a number of factors may hamper implementation of desired conditions, including fully or partially clogged pipes and irrigation lines within the indoor farm itself or within environmental conditioning equipment for the indoor farm.

The CAE may include hundreds or thousands of nutrient water nozzles and other fluid conduits, all of which are subject to flow blockage. Blockages can cause plant rot and death. Conventional flow sensors are not easily scalable because they require equipment that is mechanically or electrically complex at the site measurement. Capacitive sensors measure whether a pipe is full or empty, but do not detect a clog. Paddle wheel sensors are prone to breakdown because of moving parts. Ultrasonic sensors are complex (and thus expensive) due to the complexity of the components (e.g., transducers, signal processing) required. Moreover, they must be precisely manufactured and calibrated to ensure they resonate at the correct frequency.

A constant temperature anemometer ("CTA") determines flow based on the cooling effect of flow on a heated body, such as a wire placed normal to the flow. The convective heat transfer from the wire is a function of the velocity of the flow. The wire is connected to one arm of a Wheatstone bridge and heated by the electric current flowing through the bridge. A servo amplifier controls the current so that the resistance in the sensor bridge arm—and thus the temperature—is kept constant, independent of the cooling imposed by the fluid. The bridge voltage represents the heat transfer and is thus a direct measure of the velocity. The bridge voltage is low-pass filtered and converted to a digital signal via an analog-to-digital converter. However, the conventional CTA suffers from disadvantages, including that each CTA is conceived as a stand-alone unit.

Moreover, the CTA requires that current flows through the heating element (e.g., wire), and that the heating element be in contact with the sensed fluid. This arrangement limits the CTA to designs in which the heating element is compatible with the sensed fluid (e.g., so that the element will not oxidize or shed debris into the fluid).

There is a need for a simple and easily scalable flow sensor that overcomes the disadvantages of conventional approaches and that can be incorporated into a network of such flow sensors within a CAE.

SUMMARY OF THE DISCLOSURE

The disclosure describes systems, methods and computer-readable media storing instructions for flow sensing in a controlled agricultural environment (CAE). According to embodiments of the disclosure, a digital flow sensor comprises a flow sensor element including a first digital thermometer for providing a first output and a heating element thermally coupled to the first digital thermometer. The flow sensor may further comprise a second digital thermometer for providing a second output, to form a differential flow sensor.

Logic may provide a flow measurement based at least in part upon the first and second outputs. The logic may provide the flow measurement in response to the flow sensor element and the second digital thermometer being thermally coupled to a flowing fluid, with the flow sensor element disposed downstream of the second digital thermometer.

The flow sensor may further comprise a thermally conductive element thermally coupled to the flow sensor element, to form a flow sensor assembly. The thermally conductive element may be disposed in a wall of a fluid channel to enable thermal coupling to a fluid when the fluid flows in the channel. The thermally conductive element or the heating element or both may have a thermal conductivity of at least 5 W/mK.

The flow sensor element may include a single-wire bus for communicating data and commands, and for receiving power. According to embodiments of the disclosure, the heating element is not part of a Wheatstone bridge circuit. According to embodiments of the disclosure, the logic does not perform analog-to-digital conversion on voltage of a Wheatstone bridge that includes the heating element. According to embodiments of the disclosure, the first digital thermometer includes an integrated temperature sensor component that is not thermally coupled to a heating element within the first digital thermometer. According to embodiments of the disclosure, the first digital thermometer includes no moving parts.

According to embodiments of the disclosure, a flow sensor network comprises multiple digital flow sensors, wherein data lines of the digital flow sensors in the network are all coupled to the same bus for communicating data. According to embodiments of the disclosure, commands are also communicated over the network bus. According to embodiments of the disclosure, the network bus is a single-wire bus. According to embodiments of the disclosure, the heating elements of the digital flow sensors in the network are coupled to the same current source.

BRIEF DESCRIPTION OF THE DRAWINGS

FIGS. 3A and 3B are perspective views of an example grow tower.

FIG. 4A is a top view of an example grow tower; FIG. 4B is a perspective, top view of an example grow tower; FIG. 4C is an elevation view of a section of an example grow tower; and FIG. 4D is a sectional, elevation view of a portion of an example grow tower.

FIG. 14A illustrates an example gutter according to embodiments of the disclosure; FIG. 14B is a side elevation view of a collector end structure of the gutter; FIG. 14C is a perspective view of the collector end structure; FIG. 14D is a perspective view of a gutter section; and FIG. 14E is a side elevation view of the gutter section.

FIG. 15B is a side elevation view of the irrigation skid.

DETAILED DESCRIPTION OF EMBODIMENTS OF THE DISCLOSURE

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the disclosed embodiments, but is to be accorded the widest scope consistent with the claims and the principles and features disclosed herein.

Exemplary Indoor Agricultural System

The following describes a vertical farm production system configured for high density growth and crop yield. Although embodiments of the disclosure will primarily be described in the context of a vertical farm in which plants are grown in towers, those skilled in the art will recognize that the principles described herein are not limited to a vertical farm or the use of grow towers, but rather apply to plants grown in any structural arrangement.

Figure 1:
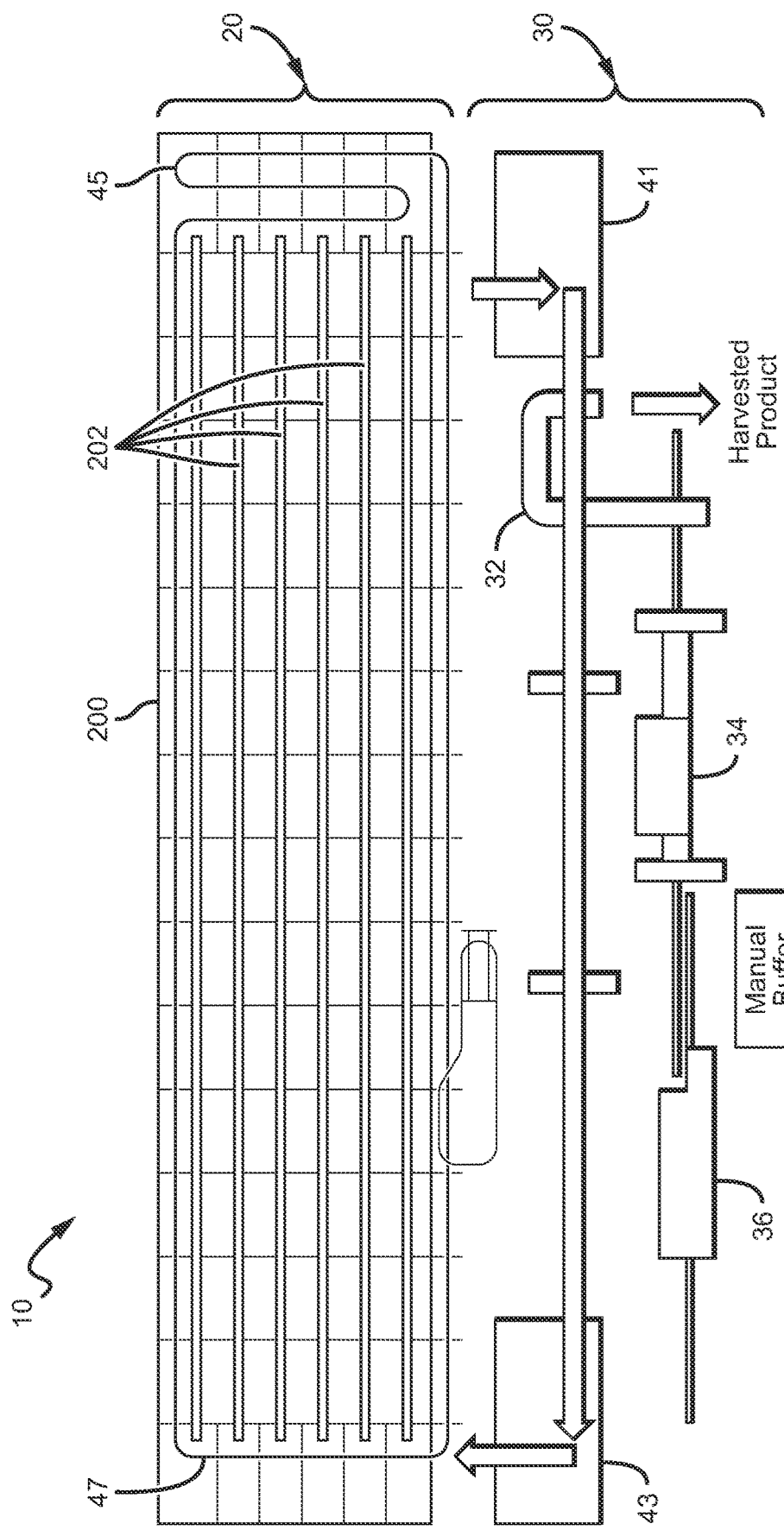
FIG. 1 is a functional block diagram illustrating an example of a controlled environment agriculture system.
Figure 2:
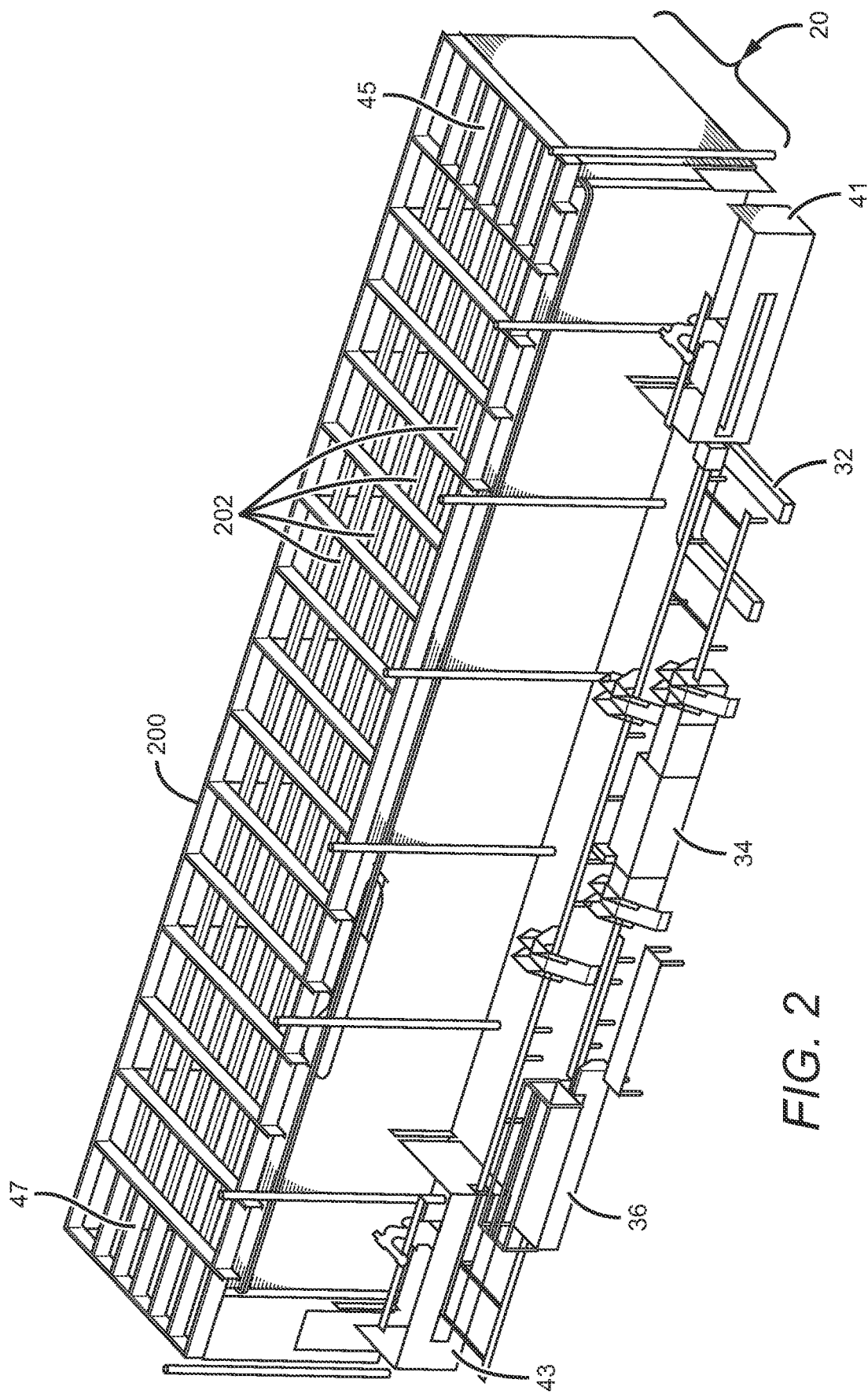
FIG. 2 is a perspective view of an example of a controlled environment agriculture system.

FIGS. 1 and 2 illustrate a controlled environment agriculture system 10, according to embodiments of the disclosure. At a high level, the system 10 may include an environmentally-controlled growing chamber 20, a vertical tower conveyance system 200 that is disposed within the growing chamber 20 and configured to convey vertical grow towers with crops disposed therein, and a central processing facility 30. The plant varieties that may be grown may be gravitropic/geotropic, phototropic, hydroponic, or some combination thereof. The varieties may vary considerably and include various leaf vegetables, fruiting vegetables, flowering crops, fruits, and the like. The controlled environment agriculture system 10 may be configured to grow a single crop type at a time or to grow multiple crop types concurrently.

The system 10 may also include conveyance systems for moving the grow towers in a circuit throughout the crop's growth cycle, the circuit comprising a staging area configured to load the grow towers into and out of the vertical tower conveyance mechanism 200. The central processing system 30 may include one or more conveyance mechanisms for directing grow towers to stations in the central processing system 30, e.g., stations for loading plant plugs into, and harvesting crops from, the grow towers. The vertical tower conveyance system 200 is configured to support and translate one or more grow towers 50 along grow lines 202. According to embodiments of the disclosure, the grow towers 50 hang from the grow lines 202.

Each grow tower 50 is configured to contain plant growth media that supports a root structure of at least one crop plant growing therein. Each grow tower 50 is also configured to releasably attach to a grow line 202 in a vertical orientation and move along the grow line 202 during a growth phase. Together, the vertical tower conveyance mechanism 200 and the central processing system 30 (including associated conveyance mechanisms) can be arranged in a production circuit under control of one or more computing systems.

The growth environment 20 may include light emitting sources positioned at various locations between and along the grow lines 202 of the vertical tower conveyance system 200. The light emitting sources can be positioned laterally relative to the grow towers 50 in the grow line 202 and configured to emit light toward the lateral faces of the grow towers 50, which include openings from which crops grow. The light emitting sources may be incorporated into a water-cooled, LED lighting system as described in U.S. Publication No. 2017/0146226A1, the disclosure of which is incorporated by reference in its entirety herein. In such an embodiment, the LED lights may be arranged in a bar-like structure. The bar-like structure may be placed in a vertical orientation to emit light laterally to substantially the entire length of adjacent grow towers 50. Multiple light bar structures may be arranged in the growth environment 20 along and between the grow lines 202. Other lighting systems and configurations may be employed. For example, the light bars may be arranged horizontally between grow lines 202.

The growth environment 20 may also include a nutrient supply system configured to supply an aqueous crop nutrient solution to the crops as they translate through the growth chamber 20. The nutrient supply system may apply aqueous crop nutrient solution to the top of the grow towers 50. Gravity may cause the solution travel down the vertically-oriented grow tower 50 and through the length thereof to supply solution to the crops disposed along the length of the grow tower 50. The growth environment 20 may also include an airflow source that is configured to, when a tower is mounted to a grow line 202, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth. The growth environment 20 may also include a control system, and associated sensors, for regulating at least one growing condition, such as air temperature, airflow speed, relative air humidity, and ambient carbon dioxide gas content. The control system may for example include such sub-systems as HVAC units, chillers, fans and associated ducting and air handling equipment. Grow towers 50 may have identifying attributes (such as bar codes or RFID tags). The controlled environment agriculture system 10 may include corresponding sensors and programming logic for tracking the grow towers 50 during various stages of the farm production cycle or for controlling one or more conditions of the growth environment. The operation of control system and the length of time towers remain in the growth environment can vary considerably depending on a variety of factors, such as crop type and other factors.

The grow towers 50 with newly transplanted crops or seedlings are transferred from the central processing system 30 into the vertical tower conveyance system 200. Vertical tower conveyance system 200 moves the grow towers 50 along respective grow lines 202 in growth environment 20 in a controlled fashion. Crops disposed in grow towers 50 are exposed to the controlled conditions of the growth environment (e.g., light, temperature, humidity, air flow, aqueous nutrient supply, etc.). The control system is capable of automated adjustments to optimize growing conditions within the growth chamber 20 and make continuous improvements to various attributes, such as crop yields, visual appeal and nutrient content. In addition, US Patent Publication Nos. 2018/0014485 and 2018/0014486, incorporated by reference herein, describe application of machine learning and other operations to optimize grow conditions in a vertical farming system. In some implementations, environmental condition sensors may be disposed on grow towers 50 or at various locations in the growth environment 20. When crops are ready for harvesting, grow towers 50 with crops to be harvested are transferred from the vertical tower conveyance system 200 to the central processing system 30 for harvesting and other processing operations.

Central processing system 30 may include processing stations directed to injecting seedlings into towers 50, harvesting crops from towers 50, and cleaning towers 50 that have been harvested. Central processing system 30 may also include conveyance mechanisms that move towers 50 between such processing stations. For example, as FIG. 1 illustrates, central processing system 30 may include harvester station 32, washing station 34, and transplanter station 36. Harvester station 32 may deposit harvested crops into food-safe containers and may include a conveyance mechanism for conveying the containers to post-harvesting facilities (e.g., preparation, washing, packaging and storage).

Controlled environment agriculture system 10 may also include one or more conveyance mechanisms for transferring grow towers 50 between growth environment 20 and central processing system 30. In the implementation shown, the stations of central processing system 30 operate on grow towers 50 in a horizontal orientation. In one implementation, an automated pickup (loading) station 43, and associated control logic, may be operative to releasably grasp a horizontal tower from a loading location, rotate the tower to a vertical orientation and attach the tower to a transfer station for insertion into a selected grow line 202 of the growth environment 20. On the other end of growth environment 20, automated laydown (unloading) station 41, and associated control logic, may be operative to releasably grasp and move a vertically oriented grow tower 50 from a buffer location, rotate the grow tower 50 to a horizontal orientation and place it on a conveyance system for loading into harvester station 32. In some implementations, if a grow tower 50 is rejected due to quality control concerns, the conveyance system may bypass the harvester station 32 and carry the grow tower to washing station 34 (or some other station). The automated laydown and pickup stations 41 and 43 may each comprise a six-degrees of freedom robotic arm, such as a FANUC robot. The stations 41 and 43 may also include end effectors for releasably grasping grow towers 50 at opposing ends.

Growth environment 20 may also include automated loading and unloading mechanisms for inserting grow towers 50 into selected grow lines 202 and unloading grow towers 50 from the grow lines 202. According to embodiments of the disclosure, a load transfer conveyance mechanism 47 may include a powered and free conveyor system that conveys carriages each loaded with a grow tower 50 from the automated pickup station 43 to a selected grow line 202. Vertical grow tower conveyance system 200 may include sensors (such as RFID or bar code sensors) to identify a given grow tower 50 and, under control logic, select a grow line 202 for the grow tower 50. The load transfer conveyance mechanism 47 may also include one or more linear actuators that pushes the grow tower 50 onto a grow line 202. Similarly, the unload transfer conveyance mechanism 45 may include one or more linear actuators that push or pull grow towers from a grow line 202 onto a carriage of another powered and free conveyor mechanism, which conveys the carriages 1202 from the grow line 202 to the automated laydown station 41.

Figure 12:
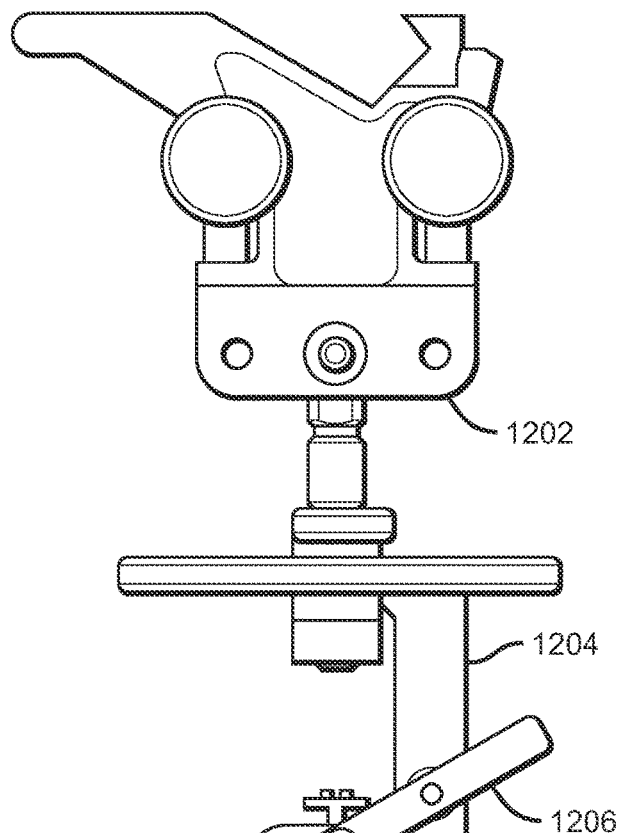
FIG. 12 is an elevation view of an example carriage assembly.

FIG. 12 illustrates a carriage 1202 that may be used in a powered and free conveyor mechanism. In the implementation shown, carriage 1202 includes hook 1204 that engages hook 52 of grow tower 50. A latch assembly 1206 may secure the grow tower 50 while it is being conveyed to and from locations in the system. In one implementation, one or both of load transfer conveyance mechanism 47 and unload transfer conveyance mechanism 45 may be configured with a sufficient track distance to establish a zone where grow towers 50 may be buffered. For example, unload transfer conveyance mechanism 45 may be controlled such that it unloads a set of towers 50 to be harvested unto carriages 1202 that are moved to a buffer region of the track. On the other end, automated pickup station 43 may load a set of towers to be inserted into growth environment 20 onto carriages 1202 disposed in a buffer region of the track associated with load transfer conveyance mechanism 47.

Grow Towers

Grow towers 50 provide the sites for individual crops to grow in the system. As FIGS. 3A and 3B illustrate, a tower 50 includes a hook 52 at the top. Hook 52 allows grow tower 50 to be supported by a grow line 202 when it is inserted into the vertical tower conveyance system 200. In one implementation, a grow tower 50 measures 5.172 meters long, where the extruded length of the tower is 5.0 meters, and the hook is 0.172 meters long. The extruded rectangular profile of the grow tower 50, in one implementation, measures 57 mm×93 mm (2.25"×3.67"). The hook 52 can be designed such that its exterior overall dimensions are not greater than the extruded profile of the grow tower 50. The dimensions of grow tower 50 can be varied depending on a number of factors, such as desired throughput, overall size of the system, and the like.

Grow towers 50 may include a set of grow sites 53 arrayed along at least one face of the grow tower 50. In the implementation shown in FIG. 4A, grow towers 50 include grow sites 53 on opposing faces such that plants protrude from opposing sides of the grow tower 50. Transplanter station 36 may transplant seedlings into empty grow sites 53 of grow towers 50, where they remain in place until they are fully mature and ready to be harvested. In one implementation, the orientation of the grow sites 53 are perpendicular to the direction of travel of the grow towers 50 along grow line 202. In other words, when a grow tower 50 is inserted into a grow line 202, plants extend from opposing faces of the grow tower 50, where the opposing faces are parallel to the direction of travel. Although a dual-sided configuration is preferred, the invention may also be utilized in a single-sided configuration where plants grow along a single face of a grow tower 50.

U.S. application Ser. No. 15/968,425 filed on May 1, 2018, which is incorporated by reference herein for all purposes, discloses an example tower structure configuration that can be used in connection with various embodiments of the disclosure. In the implementation shown, grow towers 50 may each comprise three extrusions which snap together to form one structure. As shown, the grow tower 50 may be a dual-sided hydroponic tower, where the tower body 103 includes a central wall 56 that defines a first tower cavity 54a and a second tower cavity 54b. FIG. 4B provides a perspective view of an exemplary dual-sided, multi-piece hydroponic grow tower 50 in which each front face plate 101 is hingeably coupled to the tower body 103. In FIG. 4B, each front face plate 101 is in the closed position. The cross-section of the tower cavities 54a, 54b may be in the range of 1.5 inches by 1.5 inches to 3 inches by 3 inches, where the term "tower cavity" refers to the region within the body of the tower and behind the tower face plate. The wall thickness of the grow towers 50 maybe within the range of 0.065 to 0.075 inches. A dual-sided hydroponic tower, such as that shown in FIGS. 4A and 4B, has two back-to-back cavities 54a and 54b, each preferably within the noted size range. In the configuration shown, the grow tower 50 may include (i) a first V-shaped groove 58a running along the length of a first side of the tower body 103, where the first V-shaped groove is centered between the first tower cavity and the second tower cavity; and (ii) a second V-shaped groove 58b running along the length of a second side of the tower body 103, where the second V-shaped groove is centered between the first tower cavity and the second tower cavity. The V-shaped grooves 58a, 58b may facilitate registration, alignment and/or feeding of the towers 50 by one or more of the stations in central processing system 30.

U.S. application Ser. No. 15/968,425 discloses additional details regarding the construction and use of towers that may be used in embodiments of the disclosure. Another attribute of V-shaped grooves 58a, 58b is that they effectively narrow the central wall 56 to promote the flow of aqueous nutrient solution centrally where the plant's roots are located. Other implementations are possible. For example, a grow tower 50 may be formed as a unitary, single extrusion, where the material at the side walls flex to provide a hinge and allow the cavities to be opened for cleaning.

As FIGS. 4C and 4D illustrate, grow towers 50 may each include a plurality of receptacles 105, for example cut-outs 105 as shown, for use with a compatible growth module 158, such as a plug holder. Each plug holder holds a plant of a given variety. Plug holder 158 may be ultrasonically welded, bonded, or otherwise attached to tower face 101. As shown, the growth modules 158 may be oriented at a 45-degree angle relative to the front face plate 101 and the vertical axis of the grow tower 50. It should be understood, however, that tower design disclosed in the present application is not limited to use with a particular plug holder or orientation, rather, the towers disclosed herein may be used with any suitably sized or oriented growth module. As such, cut-outs 105 are only meant to illustrate, not limit, the present tower design and it should be understood that embodiments may employ towers with other receptacle designs. In particular, receptacle supports other than towers may be used to support plants. In general, the receptacles may be part of any receptacle support structure for supporting plants within the grow space. For example, the receptacles may be laid out in rows and columns in a horizontal plane. The receptacle support may comprise a member (e.g., a tray, a table, an arm) holding multiple receptacles in a longitudinal (e.g., row) direction. The receptacles may be conveyed during their growth cycle in the longitudinal direction.

The use of a hinged front face plate simplifies manufacturing of grow towers, as well as tower maintenance in general and tower cleaning in particular. For example, to clean a grow tower 50 the face plates 101 are opened from the body 103 to allow easy access to the body cavity 54a or 54b. After cleaning, the face plates 101 are closed. Since the face plates remain attached to the tower body 103 throughout the cleaning process, it is easier to maintain part alignment and to insure that each face plate is properly associated with the appropriate tower body and, assuming a double-sided tower body, that each face plate 101 is properly associated with the appropriate side of a specific tower body 103. Additionally, if the planting and/or harvesting operations are performed with the face plate 101 in the open position, for the dual-sided configuration both face plates can be opened and simultaneously planted and/or harvested, thus eliminating the step of planting and/or harvesting one side and then rotating the tower and planting and/or harvesting the other side. In other embodiments, planting and/or harvesting operations are performed with the face plate 101 in the closed position.

Other implementations are possible. For example, grow tower 50 can comprise any tower body that includes a volume of medium or wicking medium extending into the tower interior from the face of the tower (either a portion or individual portions of the tower or the entirety of the tower length. For example, U.S. Pat. No. 8,327,582, which is incorporated by reference herein, discloses a grow tube having a slot extending from a face of the tube and a grow medium contained in the tube. The tube illustrated therein may be modified to include a hook 52 at the top thereof and to have slots on opposing faces, or one slot on a single face.

Vertical Tower Conveyance System

Figure 5A:
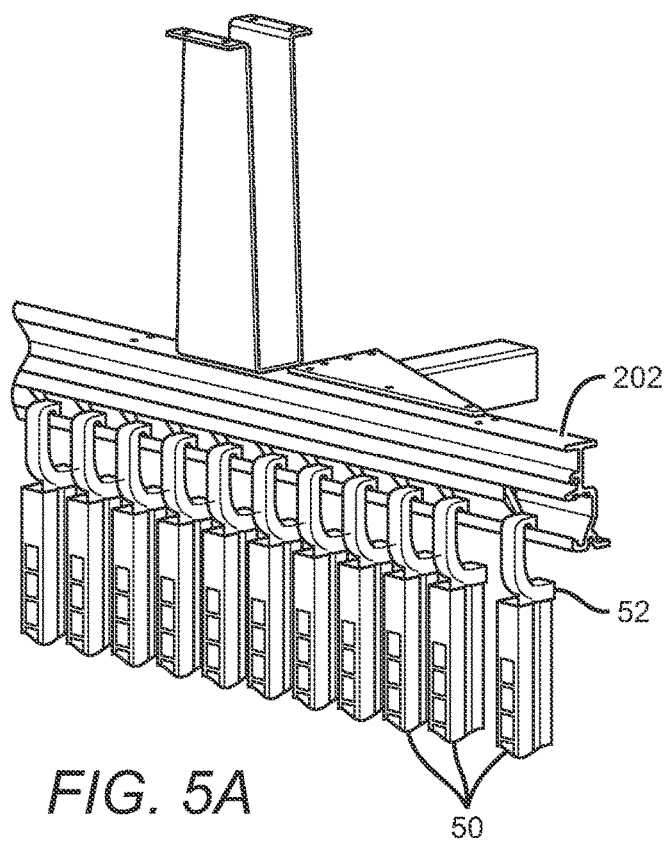
FIG. 5A is a perspective view of a portion of an example grow line.
Figure 5B:
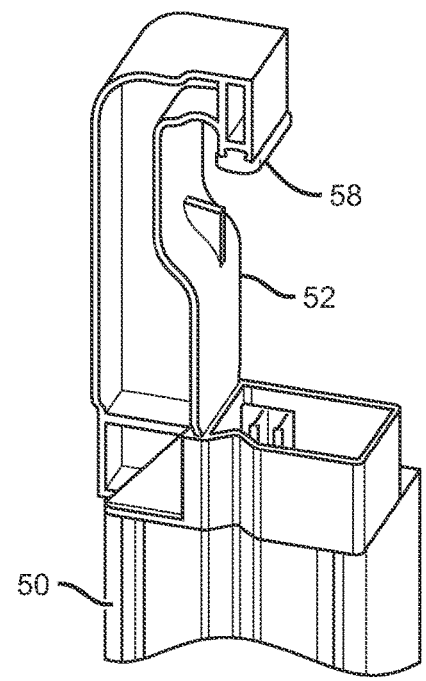
FIG. 5B is a perspective view of an example tower hook.

FIG. 5A illustrates a portion of a grow line 202 in the vertical tower conveyance system 200. According to embodiments of the disclosure, the vertical tower conveyance system 200 includes grow lines 202 arranged in parallel. As discussed elsewhere herein, automated loading and unloading mechanisms 45, 47 may selectively load and unload grow towers 50 from a grow line 202 under automated control systems. As shown, each grow line 202 supports a plurality of grow towers 50. In one implementation, a grow line 202 may be mounted to the ceiling (or other support) of the grow structure by a bracket for support purposes. Hook 52 hooks into, and attaches, a grow tower 50 to a grow line 202, thereby supporting the tower in a vertical orientation as it is translated through the vertical tower conveyance system 200. A conveyance mechanism moves towers 50 attached to respective grow lines 202.

Figure 8:
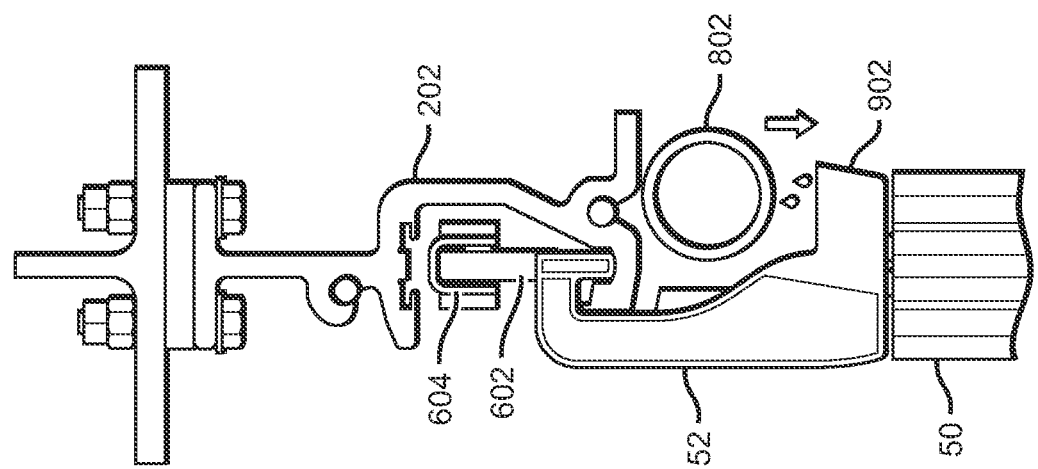
FIG. 8 is a profile view of an example grow line and irrigation supply line.
Figure 10:
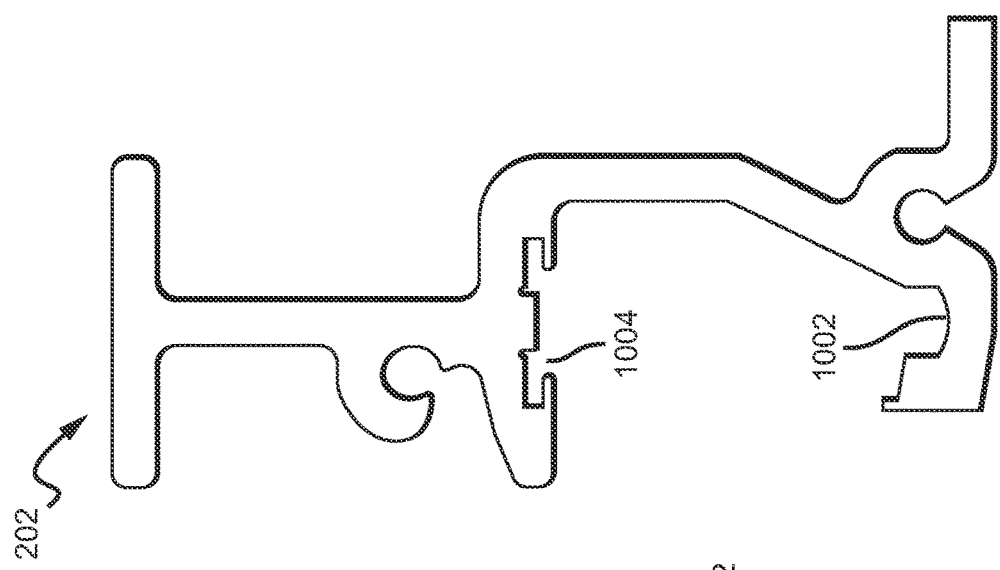
FIG. 10 is a profile view of an example grow line.
Figure 9:
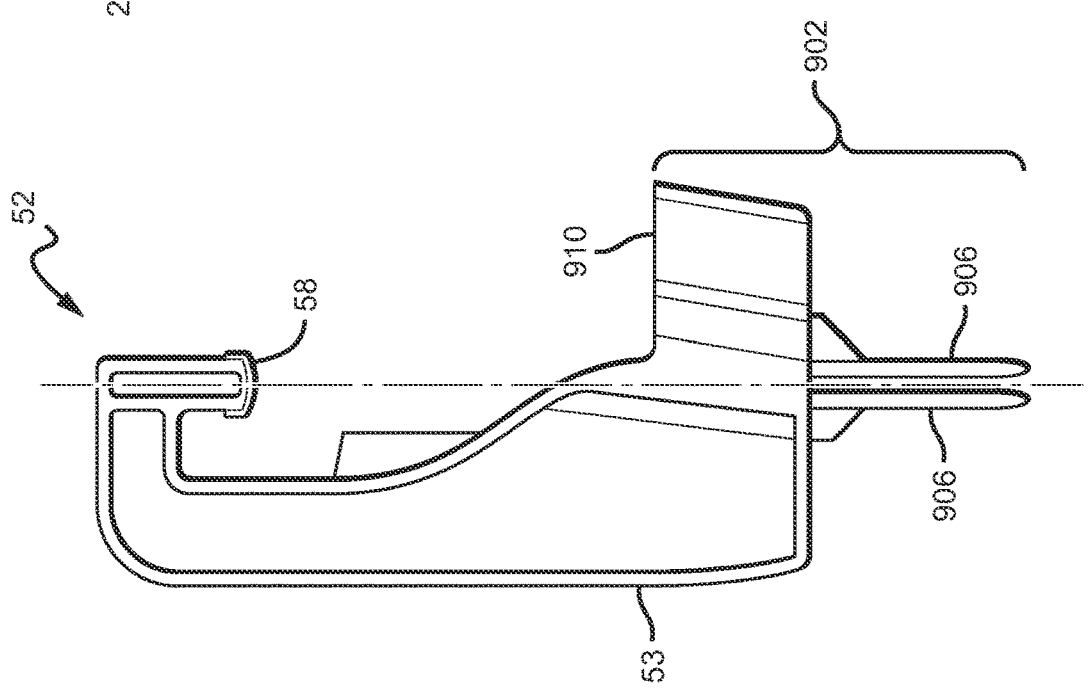
FIG. 9 is a side view of an example tower hook and integrated funnel structure.

FIG. 10 illustrates the cross section or extrusion profile of a grow line 202, according to embodiments of the disclosure. The grow line 202 may be an aluminum extrusion. The bottom section of the extrusion profile of the grow line 202 includes an upward facing groove 1002. As FIG. 9 shows, hook 52 of a grow tower 50 includes a main body 53 and corresponding member 58 that engages groove 1002 as shown in FIGS. 5A and 8. These hooks allow the grow towers 50 to hook into the groove 1002 and index along the grow line 202 as discussed below. Conversely, grow towers 50 can be manually unhooked from a grow line 202 and removed from production. This ability may be necessary if a crop in a grow tower 50 becomes diseased so that it does not infect other towers. In one implementation, the width of groove 1002 (for example, 13 mm) is an optimization between two different factors. First, the narrower the groove the more favorable the binding rate and the less likely grow tower hooks 52 are to bind. Conversely, the wider the groove the slower the grow tower hooks wear due to having a greater contact patch. Similarly, the depth of the groove, for example 10 mm, may be an optimization between space savings and accidental fallout of tower hooks.

Hooks 52 may be injection-molded plastic parts. In one implementation, the plastic may be polyvinyl chloride (PVC), acrylonitrile butadiene styrene (ABS), or an Acetyl Homopolymer (e.g., Delrin® sold by DuPont Company). The hook 52 may be solvent bonded to the top of the grow tower 50 and/or attached using rivets or other mechanical fasteners. The groove-engaging member 58 which rides in the rectangular groove 1002 of the grow line 202 may be a separate part or integrally formed with hook 52. If separate, this part can be made from a different material with lower friction and better wear properties than the rest of the hook, such as ultra-high-molecular weight polyethylene or acetal. To keep assembly costs low, this separate part may snap onto the main body of the hook 52. Alternatively, the separate part also be over-molded onto the main body of hook 52.

Figure 6:
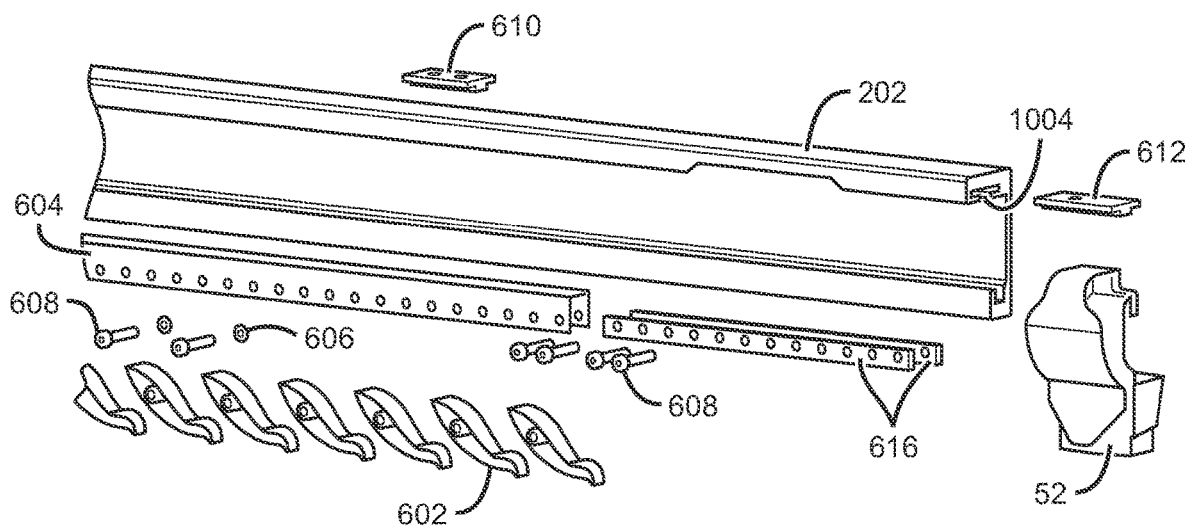
FIG. 6 is an exploded, perspective view of a portion of an example grow line and reciprocating cam mechanism.

As FIGS. 6 and 10 illustrate, the top section of the extrusion profile of grow line 202 contains a downward facing t-slot 1004. Linear guide carriages 610 (described below) ride within the t-slot 1004. The center portion of the t-slot 1004 may be recessed to provide clearance from screws or over-molded inserts which may protrude from the carriages 610. Each grow line 202 can be assembled from a number of separately fabricated sections. In one implementation, sections of grow line 202 are currently modeled in 5 to 6-meter lengths. Longer sections reduce the number of junctions but are more susceptible to thermal expansion issues and may significantly increase shipping costs. Additional features not captured by the figures include intermittent mounting holes to attach the grow line 202 to the ceiling structure and to attach irrigation lines. Interruptions to the t-slot 1004 may also be machined into the conveyor body. These interruptions allow the linear guide carriages 610 to be removed without having to slide them all the way out the end of a grow line 202.

At the junction between two sections of a grow line 202, a block 612 may be located in the t-slots 1004 of both conveyor bodies. This block serves to align the two grow line sections so that grow towers 50 may slide smoothly between them. Alternative methods for aligning sections of a grow line 202 include the use of dowel pins that fit into dowel holes in the extrusion profile of the section. The block 612 may be clamped to one of the grow line sections via a set screw, so that the grow line sections can still come together and move apart as the result of thermal expansion. Based on the relatively tight tolerances and small amount of material required, these blocks may be machined. Bronze may be used as the material for such blocks due to its strength, corrosion resistance, and wear properties.

In one implementation, the vertical tower conveyance system 200 utilizes a reciprocating linear ratchet and pawl structure (hereinafter referred to as a "reciprocating cam structure or mechanism") to move grow towers 50 along a grow line 202. FIGS. 5A, 6 and 7 illustrate one possible reciprocating cam mechanism that can be used to move grow towers 50 across grow lines 202. Pawls or "cams" 602 physically push grow towers 50 along grow line 202. Cams 602 are attached to cam channel 604 (see below) and rotate about one axis. On the forward stroke, the rotation is limited by the top of the cam channel 604, causing the cams 602 to push grow towers 50 forward. On the reserve or back stroke, the rotation is unconstrained, thereby allowing the cams to ratchet over the top of the grow towers 50. In this way, the cam mechanism can stroke a relatively short distance back and forth, yet grow towers 50 always progress forward along the entire length of a grow line 202. A control system, in one implementation, controls the operation of the reciprocating cam mechanism of each grow line 202 to move the grow towers 50 according to a programmed growing sequence. In between movement cycles, the actuator and reciprocating cam mechanism remain idle.

The pivot point of the cams 602 and the means of attachment to the cam channel 604 consists of a binding post 606 and a hex head bolt 608; alternatively, detent clevis pins may be used. The hex head bolt 608 is positioned on the inner side of the cam channel 604 where there is no tool access in the axial direction. Being a hex head, it can be accessed radially with a wrench for removal. Given the large number of cams needed for a full-scale farm, a high-volume manufacturing process such as injection molding is suitable. ABS is suitable material given its stiffness and relatively low cost. All the cams 602 for a corresponding grow line 202 are attached to the cam channel 604. When connected to an actuator, this common beam structure allows all cams 602 to stroke back and forth in unison. The structure of the cam channel 604, in one implementation, is a downward facing u-channel constructed from sheet metal. Holes in the downward facing walls of cam channel 604 provide mounting points for cams 602 using binding posts 606.

Holes of the cam channel 604, in one implementation, are spaced at 12.7 mm intervals. Therefore, cams 602 can be spaced relative to one another at any integer multiple of 12.7 mm, allowing for variable grow tower spacing with only one cam channel. The base of the cam channel 604 limits rotation of the cams during the forward stroke. All degrees of freedom of the cam channel 604, except for translation in the axial direction, are constrained by linear guide carriages 610 (described below) which mount to the base of the cam channel 604 and ride in the t-slot 1004 of the grow line 202. Cam channel 604 may be assembled from separately formed sections, such as sections in 6-meter lengths. Longer sections reduce the number of junctions but may significantly increase shipping costs. Thermal expansion is generally not a concern because the cam channel is only fixed at the end connected to the actuator. Given the simple profile, thin wall thickness, and long length needed, sheet metal rolling is a suitable manufacturing process for the cam channel. Galvanized steel is a suitable material for this application.

Linear guide carriages 610 are bolted to the base of the cam channels 604 and ride within the t-slots 1004 of the grow lines 202. In some implementations, one carriage 610 is used per 6-meter section of cam channel. Carriages 610 may be injection molded plastic for low friction and wear resistance. Bolts attach the carriages 610 to the cam channel 604 by threading into over molded threaded inserts. If select cams 602 are removed, these bolts are accessible so that a section of cam channel 604 can be detached from the carriage and removed.

Sections of cam channel 604 are joined together with pairs of connectors 616 at each joint; alternatively, detent clevis pins may be used. Connectors 616 may be galvanized steel bars with machined holes at 20 mm spacing (the same hole spacing as the cam channel 604). Shoulder bolts 618 pass through holes in the outer connector, through the cam channel 604, and thread into holes in the inner connector. If the shoulder bolts fall in the same position as a cam 602, they can be used in place of a binding post. The heads of the shoulder bolts 618 are accessible so that connectors and sections of cam channel can be removed.

Figure 7A:
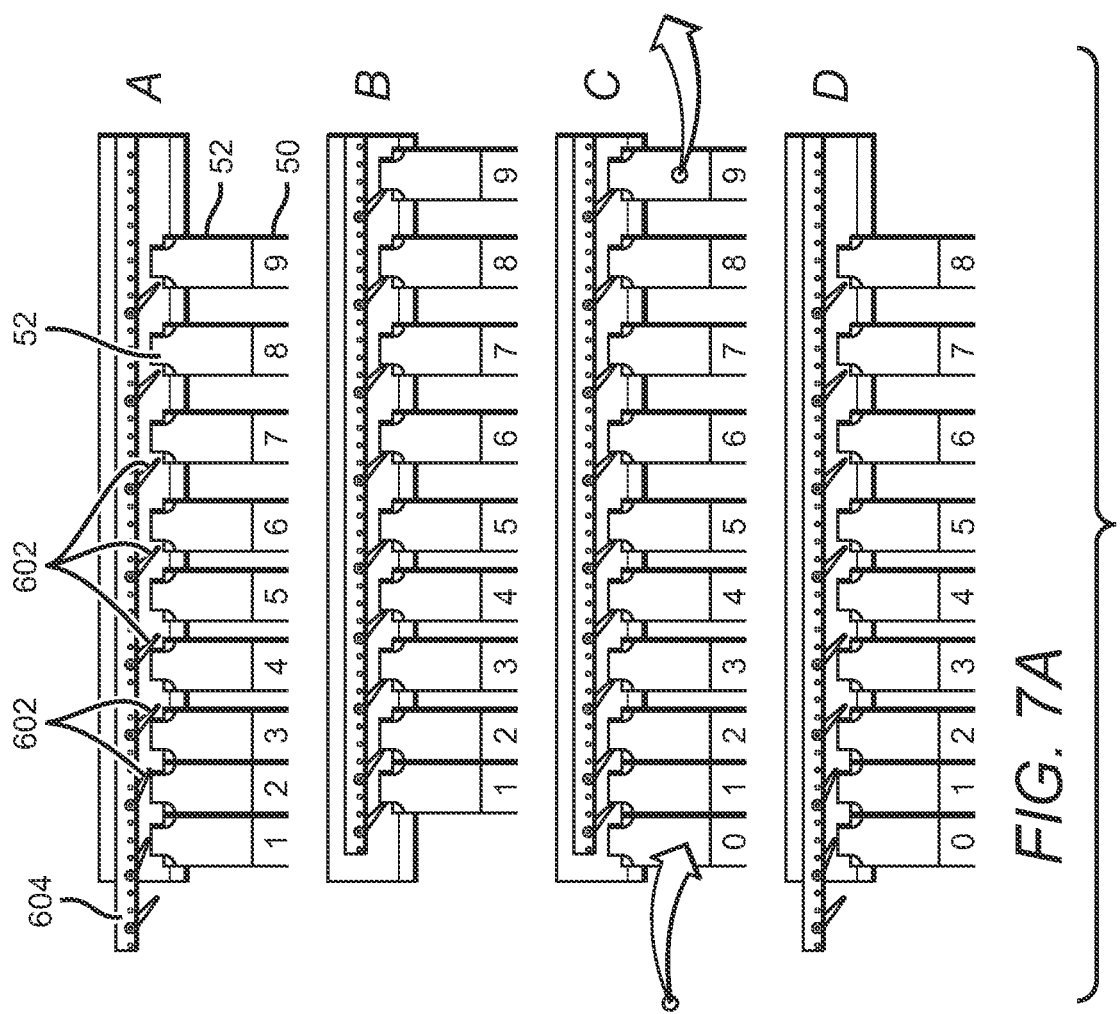
FIG. 7A is a sequence diagram illustrating operation of an example reciprocating cam mechanism.

In one implementation, cam channel 604 attaches to a linear actuator, which operates in a forward and a back stroke. A suitable linear actuator may be the T13-B4010MS053-62 actuator offered by Thomson, Inc. of Redford, Va.; however, the reciprocating cam mechanism described herein can be operated with a variety of different actuators. The linear actuator may be attached to cam channel 604 at the off-loading end of a grow line 202, rather than the on-boarding end. In such a configuration, cam channel 604 is under tension when loaded by the towers 50 during a forward stroke of the actuator (which pulls the cam channel 604) which reduces risks of buckling. FIG. 7A illustrates operation of the reciprocating cam mechanism according to embodiments of the disclosure. In step A, the linear actuator has completed a full back stroke; as FIG. 7A illustrates, one or more cams 602 may ratchet over the hooks 52 of a grow tower 50. Step B of FIG. 7A illustrates the position of cam channel 604 and cams 602 at the end of a forward stroke. During the forward stroke, cams 602 engage corresponding grow towers 50 and move them in the forward direction along grow line 202 as shown. Step C of FIG. 7A illustrates how a new grow tower 50 (Tower 0) may be inserted onto a grow line 202 and how the last tower (Tower 9) may be removed. Step D illustrates how cams 602 ratchet over the grow towers 50 during a back stroke, in the same manner as Step A. The basic principle of this reciprocating cam mechanism is that reciprocating motion from a relatively short stroke of the actuator transports towers 50 in one direction along the entire length of the grow line 202. More specifically, on the forward stroke, all grow towers 50 on a grow line 202 are pushed forward one position. On the back stroke, the cams 602 ratchet over an adjacent tower one position back; the grow towers remain in the same location. As shown, when a grow line 202 is full, a new grow tower may be loaded and a last tower unloaded after each forward stroke of the linear actuator. In some implementations, the top portion of the hook 52 (the portion on which the cams push), is slightly narrower than the width of a grow tower 50. As a result, cams 602 can still engage with the hooks 52 when grow towers 50 are spaced immediately adjacent to each other. FIG. 7A shows 9 grow towers for didactic purposes. A grow line 202 can be configured to be quite long (for example, 40 meters) allowing for a much greater number of towers 50 on a grow line 202 (such as 400-450). Other implementations are possible. For example, the minimum tower spacing can be set equal to or slightly greater than two times the side-to-side distance of a grow tower 50 to allow more than one grow tower 50 to be loaded onto a grow line 202 in each cycle.

Figure 7B:
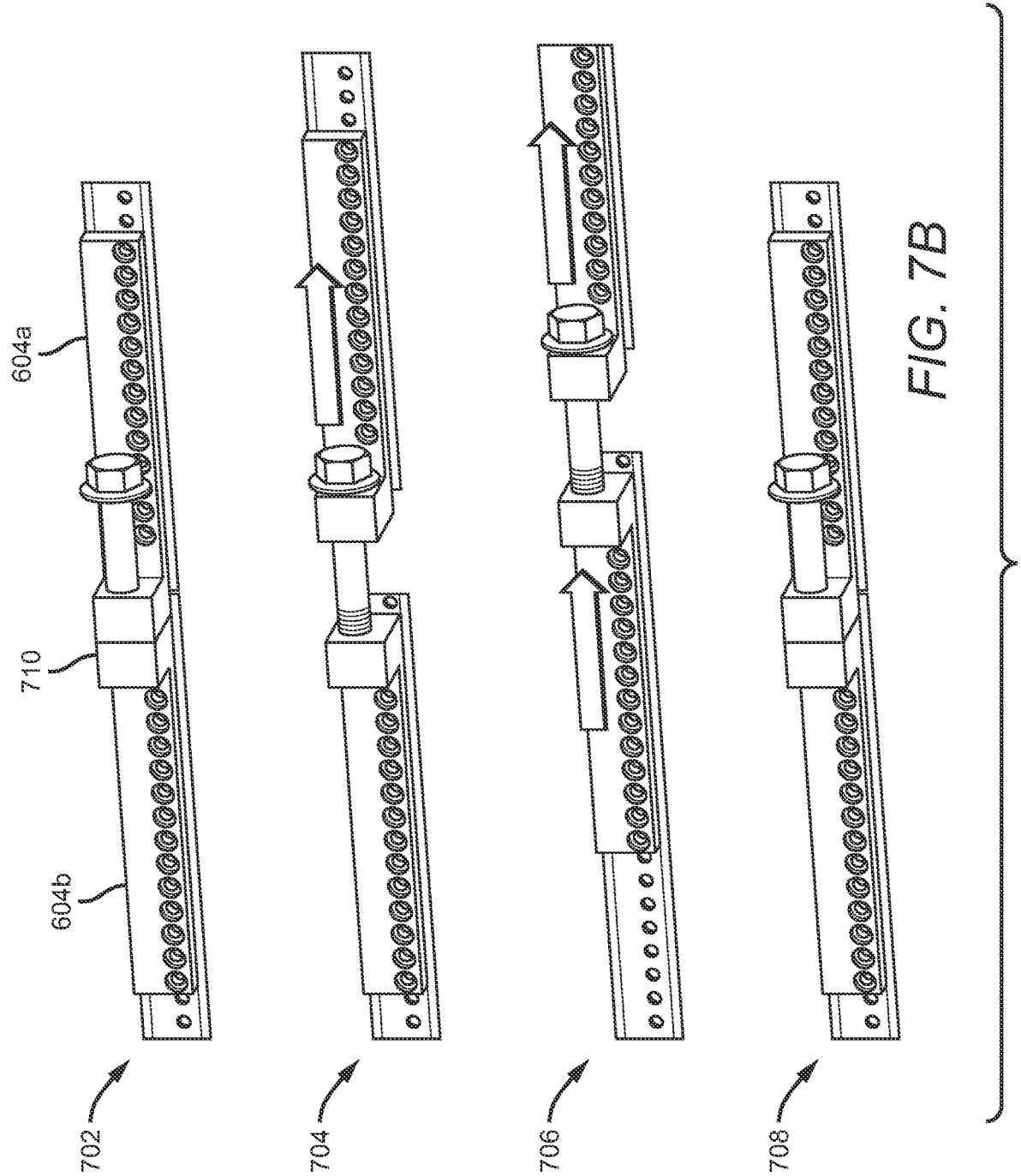
FIG. 7B illustrates an alternative cam channel including an expansion joint.

Still further, as shown in FIG. 7A, the spacing of cams 602 along the cam channel 604 can be arranged to effect one-dimensional plant indexing along the grow line 202. In other words, the cams 602 of the reciprocating cam mechanism can be configured such that spacing between towers 50 increases as they travel along a grow line 202. For example, spacing between cams 602 may gradually increase from a minimum spacing at the beginning of a grow line to a maximum spacing at the end of the grow line 202. This may be useful for spacing plants apart as they grow to increase light interception and provide spacing, and, through variable spacing or indexing, increasing efficient usage of the growth chamber 20 and associated components, such as lighting. In one implementation, the forward and back stroke distance of the linear actuator is equal to (or slightly greater than) the maximum tower spacing. During the back stroke of the linear actuator, cams 602 at the beginning of a grow line 202 may ratchet and overshoot a grow tower 50. On the forward stroke, such cams 602 may travel respective distances before engaging a tower, whereas cams located further along the grow line 202 may travel shorter distances before engaging a tower or engage substantially immediately. In such an arrangement, the maximum tower spacing cannot be two times greater than the minimum tower spacing; otherwise, a cam 602 may ratchet over and engaging two or more grow towers 50. If greater maximum tower spacing is desired, an expansion joint may be used, as illustrated in FIG. 7B. An expansion joint allows the leading section of the cam channel 604 to begin traveling before the trailing end of the cam channel 604, thereby achieving a long stroke. In particular, as FIG. 7B shows, expansion joint 710 may attach to sections 604a and 604b of cam channel 604. In the initial position (702), the expansion joint 710 is collapsed. At the beginning of a forward stroke (704), the leading section 604a of cam channel 604 moves forward (as the actuator pulls on cam channel 604), while the trailing section 604b remains stationary. Once the bolt bottoms out on the expansion joint 710 (706), the trailing section 604 of cam channel 604 begins to move forward as well. On the back stroke (708), the expansion joint 710 collapses to its initial position.

Other implementations for moving vertical grow towers 50 may be employed. For example, a lead screw mechanism may be employed. In such an implementation, the threads of the lead screw engage hooks 52 disposed on grow line 202 and move grow towers 50 as the shaft rotates. The pitch of the thread may be varied to achieve one-dimensional plant indexing. In another implementation, a belt conveyor include paddles along the belt may be employed to move grow towers 50 along a grow line 202. In such an implementation, a series of belt conveyors arranged along a grow line 202, where each belt conveyor includes a different spacing distance among the paddles to achieve one-dimensional plant indexing. In yet other implementations, a power-and-free conveyor may be employed to move grow towers 50 along a grow line 202.

Other configurations for grow line 202 are possible. For example, although the grow line 202 illustrated in the various figures is horizontal to the ground, the grow line 202 may be sloped at a slight angle, either downwardly or upwardly relative to the direction of tower travel. Still further, while the grow line 202 described above operates to convey grow towers in a single direction, the grow line 202 may be configured to include multiple sections, where each section is oriented in a different direction. For example, two sections may be perpendicular to each other. In other implementations, two sections may run parallel to each other, but have opposite directions of travel, to form a substantially u-shaped travel path. In such an implementation, a return mechanism can transfer grow towers from the end of the first path section to the onload end of the second path section of the grow line.

Irrigation & Aqueous Nutrient Supply System

Figure 13:
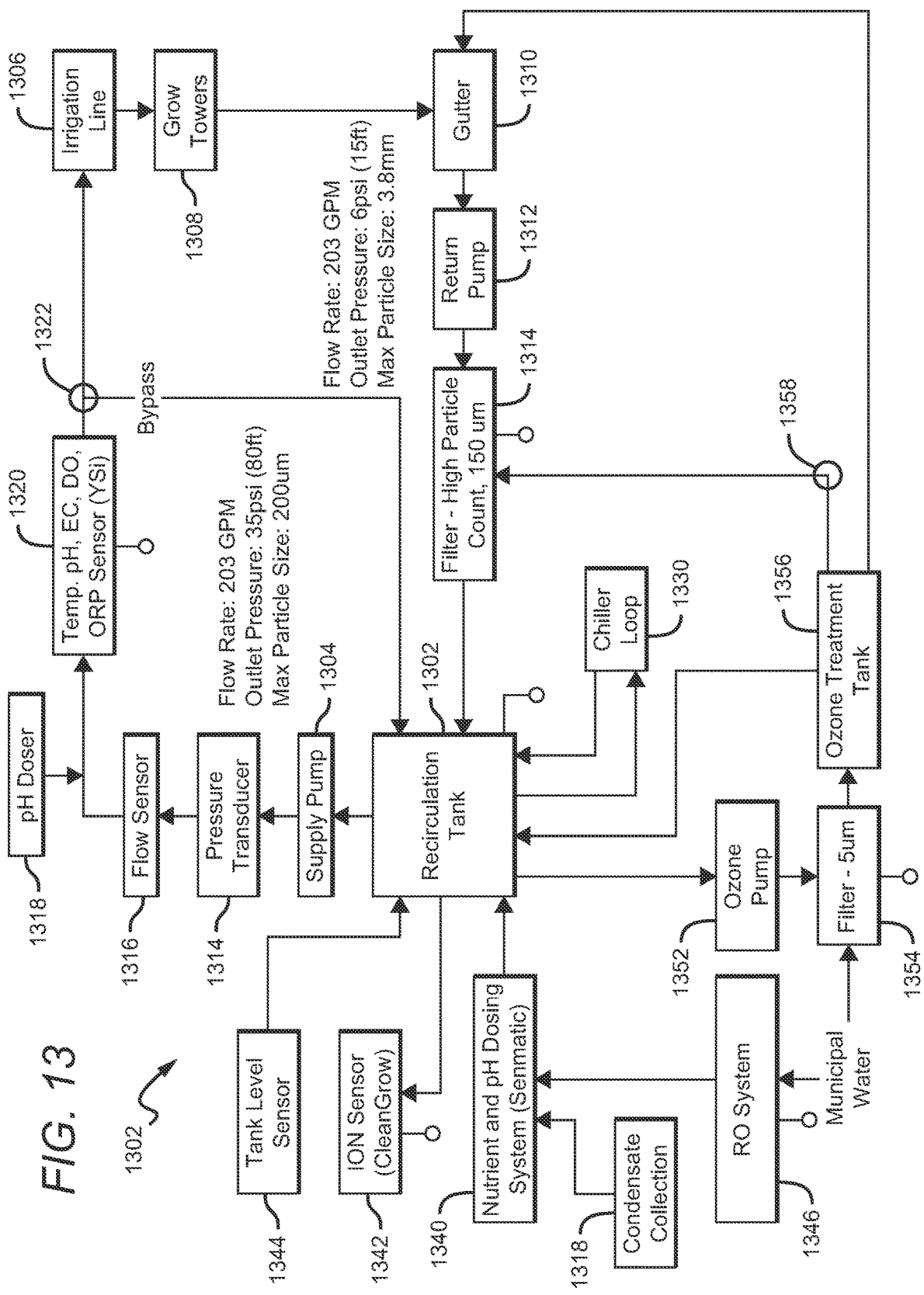
FIG. 13 is a functional block diagram illustrating an irrigation loop according to embodiments of the disclosure.

FIG. 13 is a functional block diagram setting forth the components of an irrigation system according to embodiments of the disclosure. In the implementation shown, the irrigation system 1300 is a closed-loop system comprising a recirculation tank 1302 that both supplies nutrient solution to grow towers 50 and receives excess or remaining nutrient solution returning from the grow towers 50. In the particular implementation shown, supply pump 1304 pumps aqueous nutrient solution from recirculation tank 1302 to one or more irrigation lines 1306 disposed above grow towers 1308. Gutter 1310 recovers excess aqueous nutrient solution that drops from grow towers 1308. A return pump 1312 returns excess aqueous nutrient solution to the screen filter, which then returns clean water to the recirculation tank 1302.

As FIG. 13 illustrates, irrigation system 1300 may include one or more components for conditioning or treating the aqueous nutrient solution, as well as sensing conditions at various points in the irrigation loop. For example, return filter 1314 may filter debris and other particulate matter prior to returning excess aqueous nutrient solution to the recirculation tank 1302. In one implementation, return filter may be a 150 micrometer, parabolic screen filter; however, other filters, such as media and disc filters, can be used depending on the particular application and expected particle size and quantity in excess aqueous nutrient solution. In some implementations, recirculation tank 1302 may include cooling cools. Chiller loop 1330 supplies cooling fluid through the coils to facilitate achieving a target temperature for the aqueous nutrient solution to be supplied to irrigation line 1306.

Crops in grow towers 50 will generally take up nutrients from aqueous nutrient solution, thereby lowering nutrient levels in the excess nutrient solution returning to recirculation tank 1302. Irrigation system 1300 may also include nutrient and pH dosing system 1340, ion sensor 1342 and tank level sensor 1344. During operation, ion sensor 1342 may sample the nutrient solution at a predefined interval. During sampling, ion sensor 1342 may check the ion levels of 8 separate nutrients and compare them to desired nutrient levels. Ion sensor 1342 may be an 8-ion analyzer offered by CleanGrow Sensors of Wolverhampton, United Kingdom. Responsive to detected nutrient levels, nutrient and pH dosing system 1350 may inject a single element type dose to be delivered to the recirculation tank 1302, based on the nutrient mix desired, and the room available in the tank (as sensed by tank level sensor 1344, for the water needed to transport the dose). In some implementations, nutrient and pH dosing system 1350 may use the sensed nutrient data and a desired nutrient recipe to calculate a nutrient adjustment mix to adjust the nutrient levels of recirculation tank 1302, using the smallest available volume in the tank. Nutrient and pH dosing system 1340 may include one or more venturi injectors for dosing particular nutrient solutions into the irrigation loop. In one implementation, nutrient and pH dosing system 1340 is an AMI Penta Fertilizer Mixer unit offered by Senmatic A/S of Sanderso, Denmark.

Irrigation system 1300 may also include pressure transducer 1314 and flow sensor 1316 to monitor irrigation loop conditions and control the operation of supply pump 1304. According to embodiments of the disclosure, flow sensors 1316 may also be located in or near air supply ducts or nutrient water returns (e.g., gutters). Irrigation system 1300 may also use water from condensate collection mechanism 1348, in one implementation as a primary source of water for the nutrient water. Condensate collection mechanism 1348 recaptures condensate in the air contained within growth environment 20 using, in one implementation, mechanical dehumidification. Reverse osmosis system 1346 filters water received from an external water source, such as a municipal water system, to the extent irrigation system 1300 requires additional water. In some implementations, reverse osmosis system 1346 may also filter water received from condensate collection mechanism 1346. Irrigation system 1300 may also include components for ozone treatment and cleaning of aqueous nutrient solution. For example, ozone pump 1352 supplies aqueous nutrient solution to ozone treatment tank 1356 filtered by filter 1354. Bypass valve 1358 can be used to redirect ozone injected water to treat the screen filter.

Irrigation system 1300 may also include in-line pH dosing system 1318 and 5-in-1 sensor 1320. 5-in-1 sensor samples temperature, pH, Electrical Conductivity (EC), dissolved oxygen and oxidization reduction potential of aqueous nutrient solution. In-line pH dosing system 1318 can make micro-adjustments to pH levels based on sensed pH in the irrigation loop. The cooling loop 1380 may be controlled based on the temperature that is read by 5-1 sensor 1320. Irrigation system 1300 may also include bypass valve 1322 to allow the irrigation supply, sensing components, and/or the filter to run without aqueous nutrient solution reaching irrigation line 1306. Bypass valve 1322 can be used to test irrigation system 1300 and/or use bypass valve 1322 to divert aqueous nutrient solution from irrigation line 1306 until desired pH and other conditions are met.

FIG. 8 illustrates how an irrigation line 802 may be attached to grow line 202 to supply an aqueous nutrient solution to crops disposed in grow towers 50 as they translate through the vertical tower conveyance system 200. Irrigation line 802, in one implementation, is a pressurized line with spaced-apart apertures disposed at the expected locations of the grow towers 50 as they advance along grow line 202 with each movement cycle. For example, the irrigation line 802 may be a polyvinyl chloride (PVC) pipe having an inner diameter of 0.75 inches and holes having diameters of 0.125 inches. The irrigation line 802 may be approximately 40 meters in length spanning the entire length of a grow line 202. To ensure adequate pressure across the entire line, irrigation line 802 may be broken into shorter sections, each connected to a manifold, so that pressure drop is reduced and to achieve consistent flow rate across a line. Nutrient water delivery to the sections can be controlled with solenoid or on/off valves to allow for water to be supplied to only some subset of the grow towers 50 in a grow line 202.

Figure 11A:
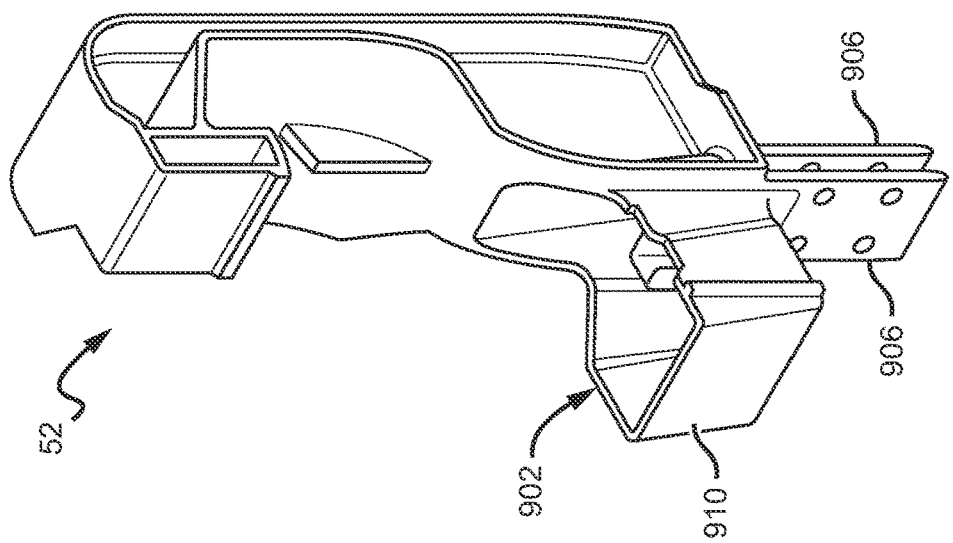
FIG. 11A is perspective view of an example tower hook and integrated funnel structure.

As FIG. 8 shows, a funnel structure 902 collects aqueous nutrient solution from irrigation line 802 and distributes the aqueous nutrient solution to the cavity(ies) 54a, 54b of the grow tower 50 as discussed in more detail below. FIGS. 9 and 11A illustrate that the funnel structure 902 may be integrated into hook 52. For example, the funnel structure 902 may include a collector 910, first and second passageways 912 and first and second slots 920. As FIG. 9 illustrates, the groove-engaging member 58 of the hook may disposed at a centerline of the overall hook structure. The funnel structure 902 may include flange sections 906 extending downwardly opposite the collector 910 and on opposing sides of the centerline. The outlets of the first and second passageways are oriented substantially adjacent to and at opposing sides of the flange sections 906, as shown. Flange sections 906 register with central wall 56 of grow tower 50 to center the hook 52 and provides additional sites to adhere or otherwise attach hook 52 to grow tower 50. In other words, when hook 52 is inserted into the top of grow tower 50, central wall 56 is disposed between flange sections 906. In the implementation shown, collector 910 extends laterally from the main body 53 of hook 52.

Figure 11B:
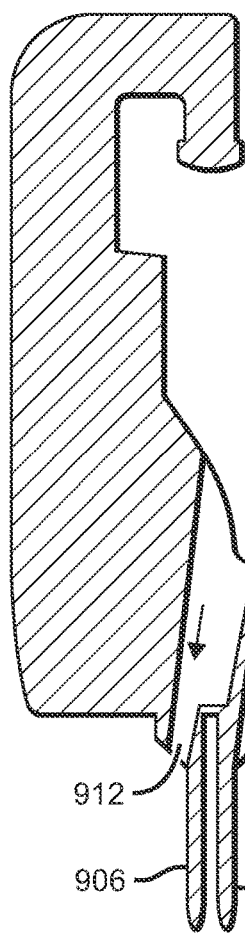
FIG. 11B is a section view of an example tower hook and integrated funnel structure.
Figure 11C:
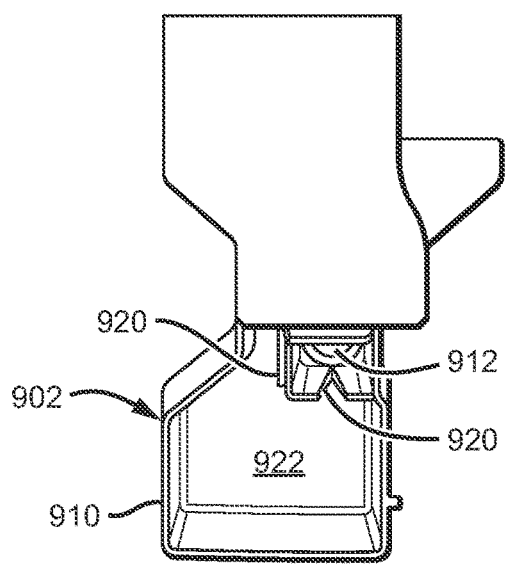
FIG. 11C is a top view of an example tower hook and integrated funnel structure.

As FIG. 11B shows, funnel structure 902 includes a collector 910 that collects nutrient fluid and distributes the fluid evenly to the inner cavities 54a and 54b of tower through passageways 912. Passageways 912 are configured to distribute aqueous nutrient solution near the central wall 56 and to the center back of each cavity 54a, 54b over the ends of the plug holders 158 and where the roots of a planted crop are expected. As FIG. 11C illustrates, in one implementation, the funnel structure 902 includes slots 920 that promote the even distribution of nutrient fluid to both passageways 912. For nutrient solution to reach passageways 912, it must flow through one of the slots 920. Each slot 920 may have a V-like configuration where the width of the slot opening increases as it extends from the substantially flat bottom surface 922 of collector 910. For example, each slot 920 may have a width of 1 millimeter at the bottom surface 922. The width of slot 920 may increase to 5 millimeters over a height of 25 millimeters. The configuration of the slots 920 causes nutrient fluid supplied at a sufficient flow rate by irrigation line 802 to accumulate in collector 910, as opposed to flowing directly to a particular passageway 912, and flow through slots 920 to promote even distribution of nutrient fluid to both passageways 912.

Other implementations are possible. For example, the funnel structure may be configured with two separate collectors that operate separately to distribute aqueous nutrient solution to a corresponding cavity 54a, 54b of a grow tower 50. In such a configuration, the irrigation supply line can be configured with one hole for each collector. In other implementations, the towers may only include a single cavity and include plug containers only on a single face 101 of the towers. Such a configuration still calls for a use of a funnel structure that directs aqueous nutrient solution to a desired middle and back portion of the tower cavity, but obviates the need for separate collectors or other structures facilitating even distribution.

In operation, irrigation line 802 provides aqueous nutrient solution to funnel structure 902 that evenly distributes the water to respective cavities 54a, 54b of grow tower 50. The aqueous nutrient solution supplied from the funnel structure 902 irrigates crops contained in respective plug containers 158 as it trickles down. In one implementation, a gutter disposed under each grow line 202 collects excess aqueous nutrient solution from the grow towers 50 for recycling. In one implementation, the width of the gutter can be configured to be larger than the width of the grow towers 50 but narrow enough to act as a guide to prevent grow towers 50 from swinging. For example, the width of the gutter can be 0.5 inches larger than the width of the grow towers 50, and the walls of the gutter can be configured to extend an inch or more higher than the bottom of grow towers 50.

The apertures of irrigation line 802 can simply be holes drilled (or otherwise machined) into the pipe structure. Water, however, has a propensity to wick onto the surface of the pipe as it exits the apertures causing water to run along the pipe and drip down outside the funnel structure of the grow towers. In some implementations, the apertures can include structures directed to reducing or controlling possible leakage caused by the foregoing. For example, the apertures may be drilled holes with slotted spring pins pressed in, drilled holes with coiled spring pins pressed in, and drilled holes with a custom machined feature around the circumference made from a custom mill tool. All three of the solutions above are intended to create a sharp lip at the exit of the hole such that water cannot run along the pipe. Still further, separate emitters can be used at the select positions along the grow line 202.

Figure 16A:
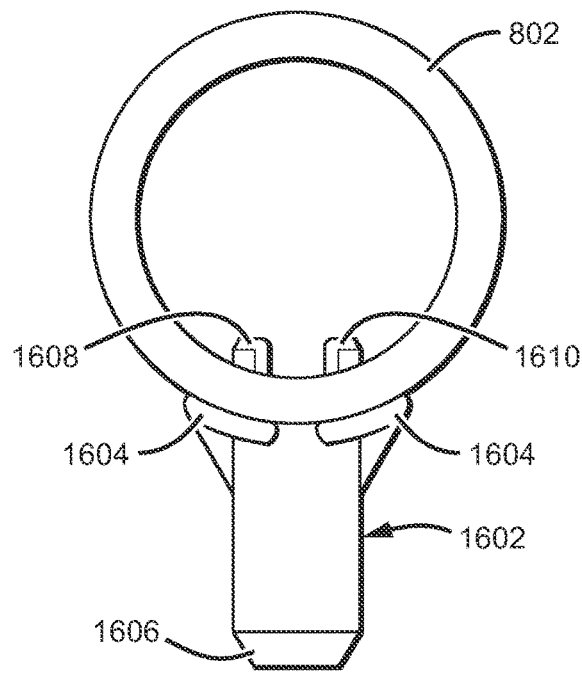
FIG. 16A is a sectional view of an irrigation line including a nozzle.
Figure 16B:
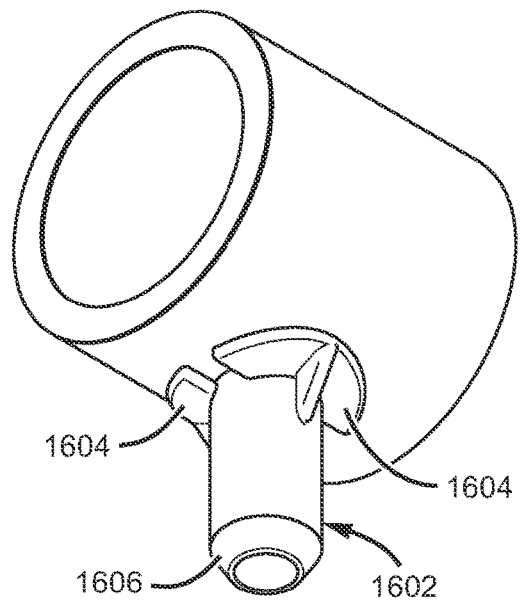
FIG. 16B is a perspective view of an irrigation line and nozzle.
Figure 16C:
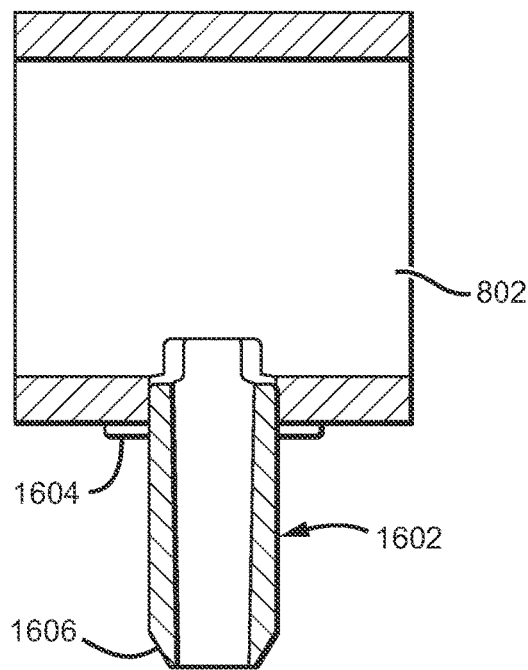
FIG. 16C is a sectional view of a nozzle disposed within an aperture of the irrigation line.
Figure 16D:
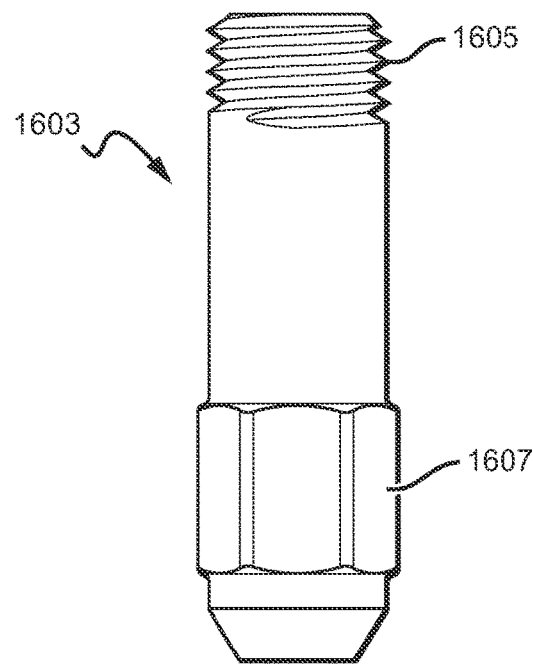
FIG. 16D is a side view of an alternative nozzle.

Other solutions are possible. For example, an injection molded part with a sharp lip may be configured to snap into the aperture or hole drilled into the irrigation line pipe. FIG. 16A is a section view of an irrigation line 802 including a nozzle 1602 attached to and extending from an aperture in irrigation line 802. FIG. 16B is a perspective view of nozzle 1602 attached to a section of irrigation line 802. FIG. 16C is a section view of nozzle 1602. As shown in FIGS. 16A and 16B, nozzle 1602 may include flanges 1604 to facilitate location and placement of nozzle 1602 in the apertures of irrigation line 802. In one implementation, nozzle 1602 may also include a small ridge or detent that engages the edge of the aperture at the inner surface of irrigation line 802 to allow nozzle 1602 to be snapped into place. Adhesives or ultrasonic welding can be used in addition to, or in lieu of, the small ridge to secure nozzle 1602. As the various figures show, nozzle 1602 includes a chamfered edge at the tip 1606 of nozzle 1602 to create a sharp transition to reduce water from wicking onto the outer surface of nozzle 1602. The upper portion 1608 of nozzle 1602 extending within irrigation line 802 may include a notch or slot 1610 to facilitate flow of nutrient solution out of irrigation line 802. Other implementations are possible. As shown in FIG. 16D for example, instead of pressing into a hole in the irrigation line 802, a nozzle 1603 may include threads 1605 which thread into a tapped hole of irrigation line 802. A seal may be formed between the threads of the nozzle and the line 802 and aided by a PTFE sealant (either thread tape or a paste). Such a nozzle 1603 may have a hexagonal portion 1607 extending along its body which allows it to be installed with a hexagonal drive tool.

Figure 17A:
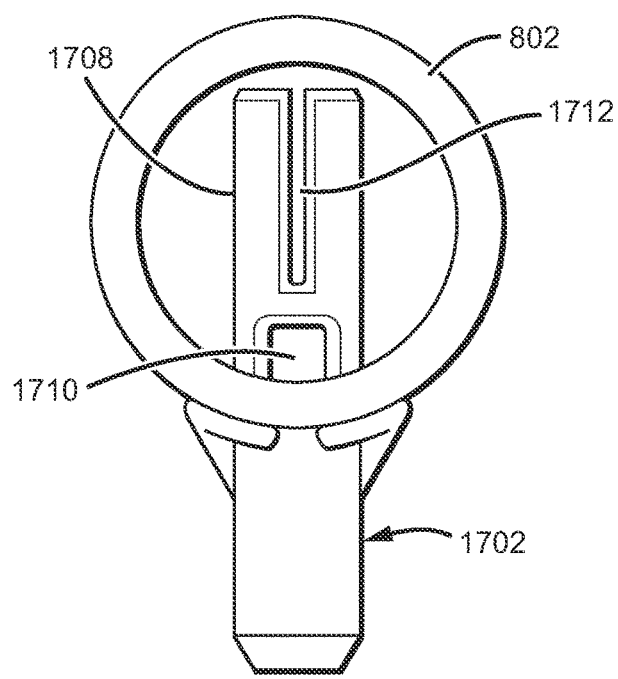
FIG. 17A is a sectional view of an irrigation line including a nozzle with an air-bleed element.
Figure 17B:
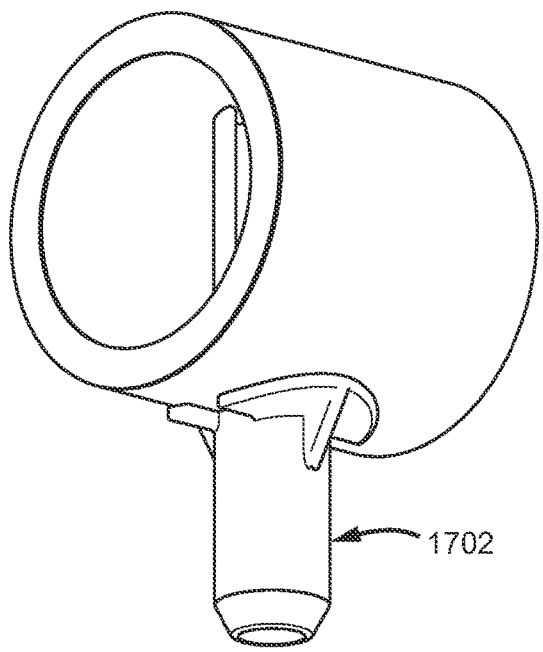
FIG. 17B is a perspective view of an irrigation line and nozzle with an air-bleed element.
Figure 17C:
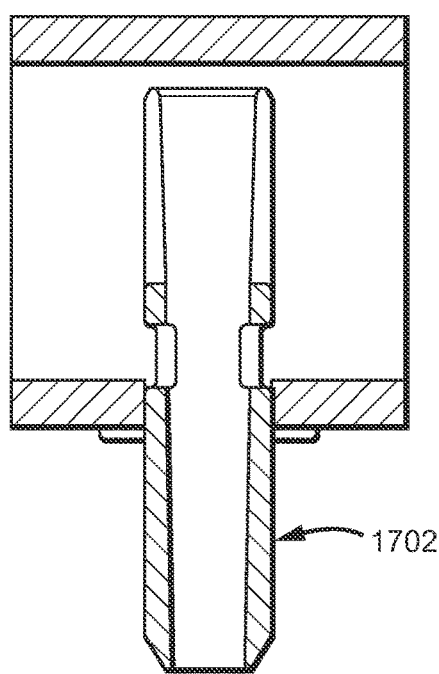
FIG. 17C is a sectional view of a nozzle with an air-bleed element disposed within an aperture of the irrigation line.

In one implementation, each aperture of irrigation line 802 may be fitted with nozzle 1602. In other implementations, the apertures at the second end (the end opposite the first end) of an irrigation line 802 (or the end of a section of irrigation line 802) may include an alternative nozzle 1702 including an air-bleed feature illustrated in FIGS. 17A, 17B and 17C. The air-bleed feature promotes consistent flow throughout irrigation line 802, as discussed in more detail below. In the implementation shown, the lower portion of nozzle 1702 is substantially the same as nozzle 1602. The upper portion 1708 of nozzle 1702 extends further into the interior of irrigation line 802 and includes slot 1810 and slit 1712. The extended upper portion 1708 facilitates bleeding air from irrigation line 802. Slit 1712 affords more room for water and air to facilitate their flow out of nozzle 1702.

Figure 18:
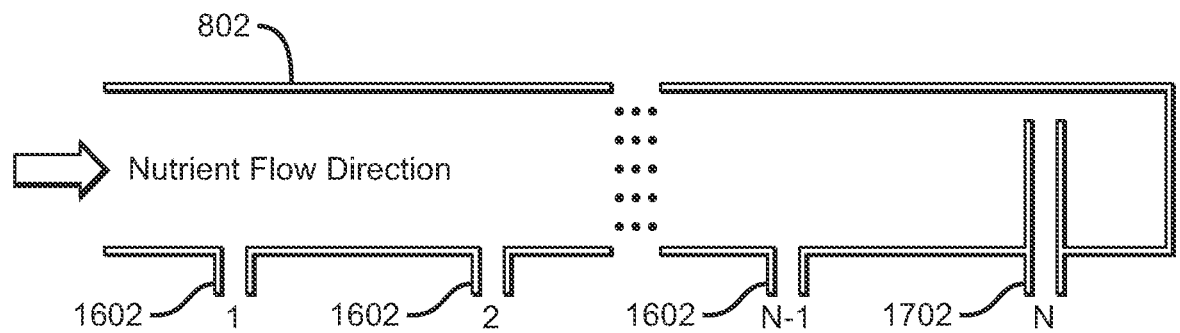
FIG. 18 is a schematic diagram of an irrigation line according to embodiments of the disclosure.

FIG. 18 is a schematic diagram illustrating an irrigation line for purposes of describing operation of the air-bleed feature described above. In various implementations, the irrigation system runs on a periodic basis in that the irrigation system is at rest between irrigation cycles. Between irrigation cycles, air fills the irrigation line 802 as the nutrient solution has drained off. At the beginning of an irrigation cycle (as the nutrient flow front moves into a section of irrigation line 802), air is pushed out of each nozzle 1602 until the nutrient solution passes a given nozzle. Once the front passes a given nozzle 1602, the nutrient solution starts to flow through the nozzle 1602 (instead of air). Nozzle N is the last nozzle to switch from air flow to nutrient flow. With this model for the nutrient flow when the irrigation cycle is started, the air flow though nozzle N should be the same if the upper portion of the last nozzle is short (i.e., matching nozzles (1602) 1, 2, . . . , N–1) or tall (to permit air venting) up to the time just before the nutrient front reaches nozzle N.

When the irrigation cycle begins and nutrient solution enters irrigation line 802, the solution pushes the air in the irrigation line 802 to the end of the line where it builds as one large pocket. With a nozzle having a shorter upper portion 1608, some of this air exits, but as the air is pushed out, water begins to cover the last (N) nozzle driving the air pocket above the water and above the last aperture. A new equilibrium is then obtained with water trickling out of the last aperture and a pocket of air sitting above the water. The air is then trapped and continues to exist in the line. Because the air takes up a volume, it prevents water from fully filling the irrigation line 802 thus creating flow out for the last aperture which is much less than at all other sites. Depending on the size of this air pocket, this weaker flow may exist for apertures (N–1, N–2, etc.) prior to the last (N) as well. The taller upper portion 1708 of nozzle 1702 allows for air to be constantly drained (i.e., small volumes of air at more frequent intervals). Because the top of the nozzle 1702 is at the top of inner surface of irrigation line 802 were the air pocket is located, air can always drain from this nozzle independently from the amount of water in the line. Unlike the shorter nozzle where a pocket of air may be trapped above the water in the line 802 and never able to exit (driving poor flow behavior), the longer nozzle 1702 allows air to more freely exit. In one implementation, the irrigation system supplies nutrient solution at a first end of the irrigation line 802. In such an implementation, nozzle 1702 is attached proximal to the second end of irrigation line 802 (or section of irrigation line 802). In other implementations, the irrigation system supplies nutrient solution to a middle portion of the irrigation line 802. In such an implementation, nozzle 1702 may be installed at both ends of irrigation line 802 (or sections thereof).

FIG. 14A illustrates an example gutter 1402 that can be disposed under a grow line 202 to collect excess aqueous nutrient solution from grow towers 50 attached to the grow line 202. In the implementation shown, gutter 1402 has a gradually-sloped (e.g., a 0.5% slope) bottom that causes excess nutrient solution to collect at end basin structure 1404. FIGS. 14B and 14C show end structure 1404 in more detail. As FIGS. 14B and 14C illustrate, basin structure 1404 couples to the low end of gutter 1402 and includes an outlet 1406 to which a pipe, barb, or other structure attaches. As FIG. 13 illustrates, return pump 1312 operably connects with a hose, or pipe, to end structure 1404 to pump excess aqueous nutrient solution back to recirculation tank 1302, as discussed above. The return pump 1312 may be controlled by utilizing an ultrasonic sensor to maintain a certain water level in the gutter as well as a pump outlet pressure in order for the nutrient solution to return to the filter on the skid.

Gutter 1402 may consist of multiple separate sections that are joined together to form a unitary structure. FIGS. 14D and 14E illustrate an example gutter section 1408 according to embodiments of the disclosure. Gutter section 1408 may comprise a main body 1410 and flanges 1412. As FIG. 14E illustrates, the bottom 1414 of gutter section is sloped. As FIG. 14A shows, multiple gutter sections are joined at respective flanges 1412 to create gutter 1402. In one implementation, gaskets between flanges of adjoining gutter sections can be used to achieve a water tight seal. Flanges 1412 may also include feet sections to facilitate securing the gutter to a floor or other structure. As FIG. 14A further illustrates, gutter sections are similar to each other, but not identical. For example, the initial height of bottom 1414 of a given gutter section 1408 substantially matches the ending height of the bottom of an adjoining gutter structure. Similarly, the ending height of bottom 1414 of the gutter structure 1408 substantially matches the initial height of the adjoining gutter section. In this manner, the overall structure achieves a substantially continuous slope causing excess aqueous nutrient solution to flow to end structure 1404 for recirculation or disposal.

Figure 15A:
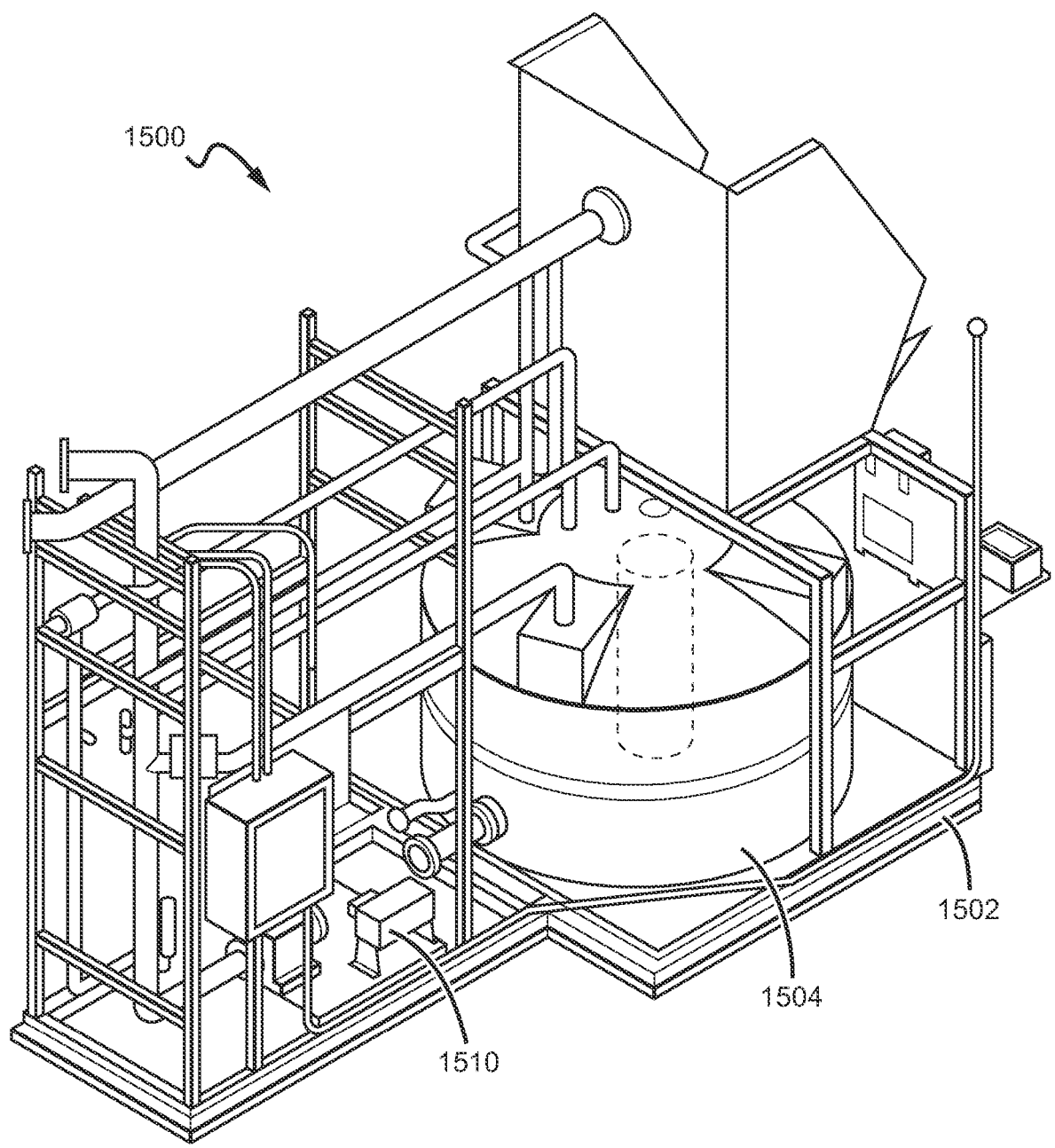
FIG. 15A is a perspective view of an example irrigation skid.

In one implementation, each grow line 202 is supported by a separate irrigation loop or zone that operates independently of irrigation loops associated with other grow lines in growth environment 20. In one implementation, each irrigation loop is supported by an irrigation skid that includes many of the components set forth in FIG. 13. Use of an irrigation skid allows for partial fabrication of the irrigation loop off site to lower overall costs of creating the crop production system. FIGS. 15A and 15B illustrate an irrigation skid 1500 according to embodiments of the disclosure. As FIGS. 15A and 15B illustrate, irrigation skid 1500 includes a frame 1502 onto which various irrigation components are mounted, such as recirculation tank 1504. In one implementation, irrigation skid 1500 also includes supply pump 1506, ozone supply pump 1508, and in-line pH dosing pump 1510. Irrigation skid 1500 also includes plumbing, valves, sensors, a filter, cooling coil, electrical and control components to connect and operate the irrigation loop. In one implementation, other components illustrated in FIG. 13 may operate or support multiple irrigation skids. For example, while irrigation skid 1500 includes ozone supply pump 1508 and associated plumbing, the remaining ozone cleaning components are separate from the skid and can be used to support multiple irrigation skids.

Nutrient and pH dosing system 1340, in one implementation, is operably connected to multiple irrigation skids 1500 by associated plumbing, valves and other controls. An irrigation control system controls valves and associated plumbing components as needed to interface nutrient and pH dosing system 1340, and associated sensors, with a given irrigation skid 1500. The Nutrient and pH dosing system has the ability to purge and rinse between dosing intervals, in order to prevent mixing of nutrient water from one recirculating loop to another. During operation, the nutrient solution in each recirculating irrigation loop is sampled on a predefined interval for that specific loop. During sampling, the ion levels of 8 separate nutrients may be checked and compared to the desired nutrient levels for that specific loop. Nutrient and pH dosing system 1340 may inject a nutrient dose to be delivered to the recirculation tank 1504 for that loop, based on the nutrient mix required and the room available in the tank for the water needed to transport the dose.

Figure 19:
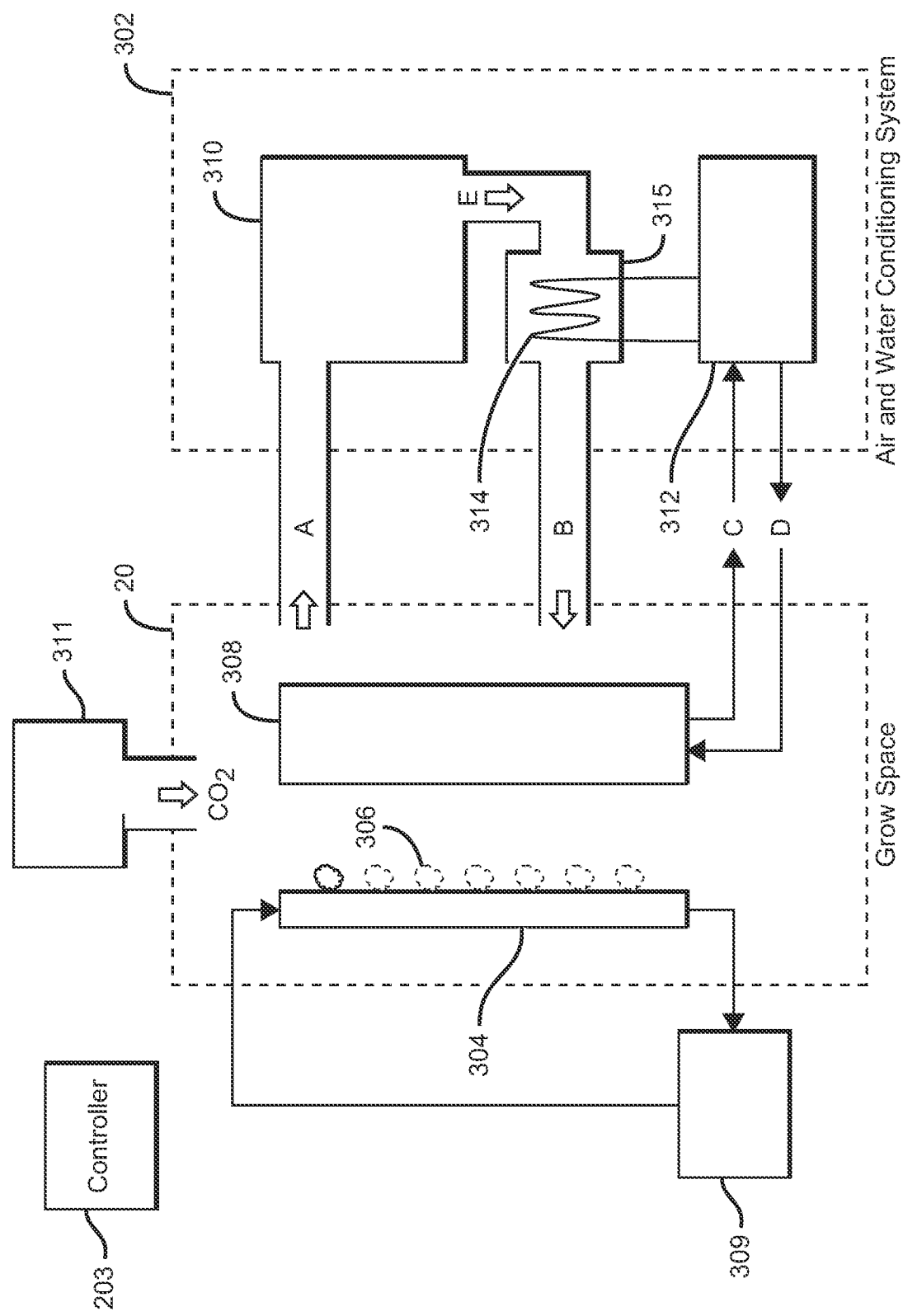
FIG. 19 illustrates a grow space and an environmental conditioning system for conditioning air and fluid in the grow space, according to embodiments of the disclosure.

FIG. 19 illustrates a plant growing environment 20 and an environmental conditioning system 302 for conditioning air and fluid (e.g., water) in the grow space 20, according to embodiments of the disclosure. The plant growing environment 20 includes at least one receptacle support structure 304 (such as a tower 50) having receptacles for holding plants 306, and a fluid-cooled light fixture 308, according to embodiments of the disclosure.

An irrigation pump 309 circulates water and nutrients through the plant support structure 304. Carbon dioxide supply equipment 311 provides carbon dioxide to the plants. The irrigation pump 309 and carbon dioxide supply equipment 311 may be considered as part of the conditioning system 302, according to embodiments of the disclosure.

According to embodiments of the disclosure, the conditioning system 302 includes a dehumidifier 310, a fluid (e.g., water) conditioning system 312, and a heating coil 314 in heat exchanger 315. The dehumidifier 310 receives return air A from the grow space 101. The conditioning system 302 provides supply air B, having a temperature and relative humidity that is controlled to meet setpoints for desired operating conditions of the plants in the environment 20.

The fluid conditioning system 312 receives return fluid C from the fluid-cooled light fixture 308. According to embodiments of the disclosures, the fluid conditioning system 312 can control the fluid temperature by varying the fluid flow rate through the light fixtures 308. The fluid conditioning system 312 supplies to the fluid-cooled light fixture 308 a supply fluid D, having a temperature that is controlled to meet set points for desired operating conditions of the plants in the environment 20.

According to embodiments of the disclosure, waste heat from the fluid passing through fluid conditioning system 312 may be provided to the heating coil 314 in the heat exchanger 315 to heat air E that is output from the dehumidifier 310. The air heated by the coil 314 is output as heated air B to the grow space 20.

The controller 203 may control all the elements of the conditioning system 302, according to embodiments of the disclosure. The controller 203 may be implemented using programmed logic, such as a computer, a microcontroller, or an ASIC. The controller 203 may receive sensed parameters from sensors distributed throughout the plant growing environment 101 and the air and water conditioning system 302, according to embodiments of the disclosure. The sensors 204 may include sensors that sense environmental conditions such as temperature; humidity; air flow; $CO_2$; irrigation flow rate; pH, EC, DO, and nutrient levels of irrigation water; and light intensity, spectrum, and schedule. The controller 203 may use the sensed parameters as feedback to instruct the conditioning system 302 to control environmental treatments (e.g., temperature, humidity) of the plant growing environment 101, according to embodiments of the disclosure.

Figure 21:
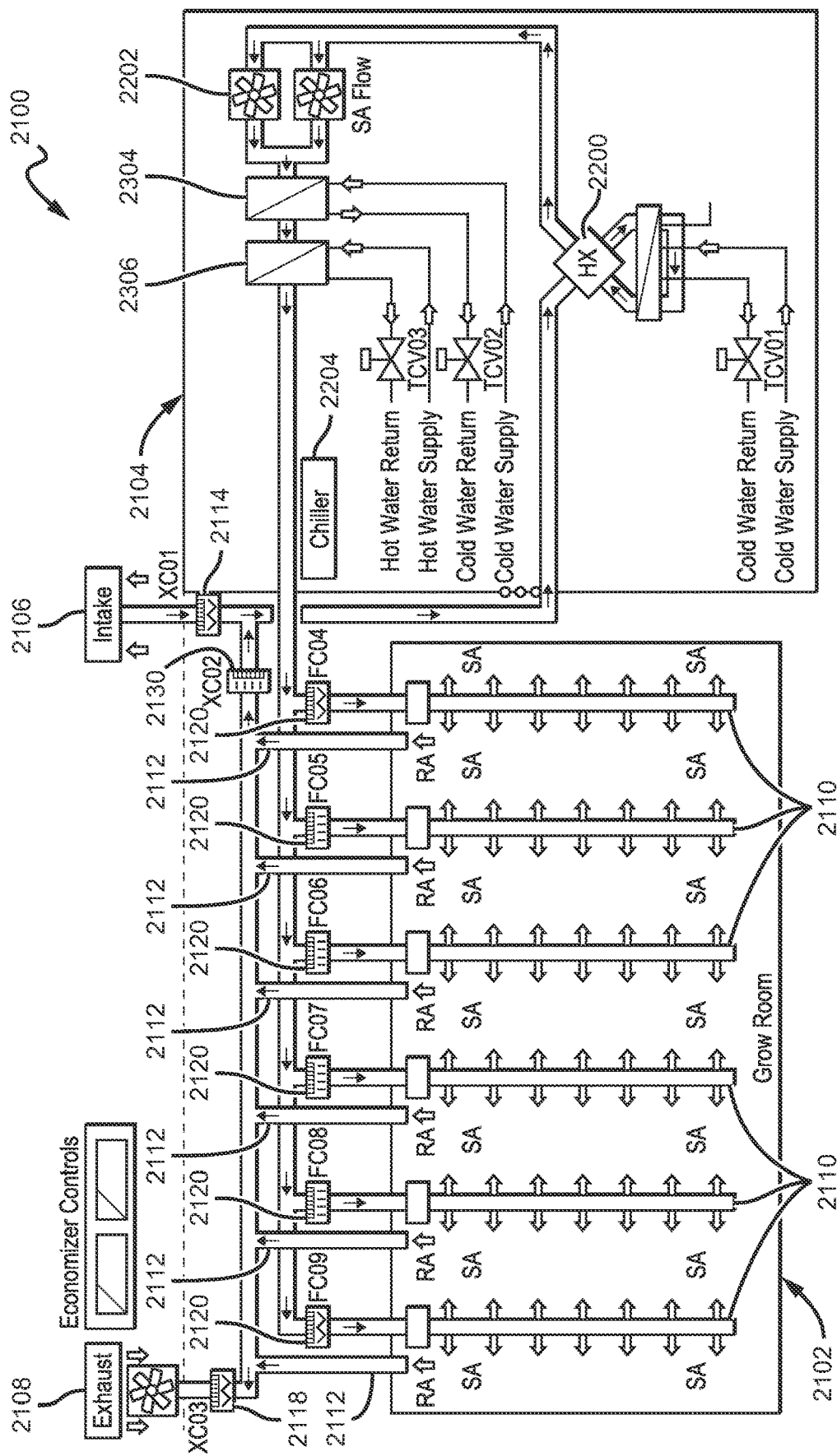
FIG. 21 illustrates an enhanced HVAC system including an economizer subsystem and an air conditioning subsystem, according to embodiments of the disclosure.

FIG. 21 illustrates an enhanced HVAC system 2100 including an economizer subsystem 2102 and an air conditioning subsystem 2104, according to embodiments of the disclosure. The economizer subsystem 2102 includes an intake vent 2106, an exhaust fan 2108, supply air ducts 2110, and return air ducts 2112. Each pair of supply and return air ducts 2110, 2112 circulate air within a zone in the grow room 20. Each supply air duct 2110 provides supply air SA. Each return air duct 2112 receives return air RA. The supply air ducts 2110 run down the aisle between pairs of grow lines 202 (not shown in this figure) of hanging grow towers 50, according to embodiments of the disclosure. (Those skilled in the art will recognize that "tower" and "receptacle support" may be used interchangeably herein as appropriate.)

The economizer 2102 includes an economizer intake damper XC01 2114 and an economizer exhaust damper XC03 2118. HVAC dampers FC04-FC09 2120 control the supply of air from air conditioning subsystem 2104 to the grow room zones. According to embodiments of the disclosure, the controller 203 may close the end dampers FC04 2120 and FC09 2120 at certain times of the day to drive more airflow at different canopy positions for specific plants. Air conditioning subsystem 2104 operates similarly to conditioning system 302 of FIG. 19. Air conditioning subsystem 2104 includes heat exchangers and HVAC supply fans 2202. A chiller 2204 provides hot and cold water to a dehumidifier system in the air conditioning subsystem.

The normal state of operation for the chiller 2204 provides both warm and cold water to the dehumidifier unit. Within the dehumidification unit are three proportional valves (TCV03, TCV02, and TCV01) that control the flow of warm and cold water to three heat exchangers 2306, 2304, 2200 that are used to heat (TCV03), cool (TCV02), and dehumidify (TCV01). The fans 2202 (SA Flow fans) blow air to the grow room 20, and dampers FC04-FC09 2120 are used to control the air flow to each of the supply ducting outputs of the line. Return Air is moved across the dehumidification coils to dehumidify the air. In normal operation mode, XC01 2114 and XC03 2118 are closed and XC02 2130 is open and no blending with outside air using economization is utilized.

Figure 22:
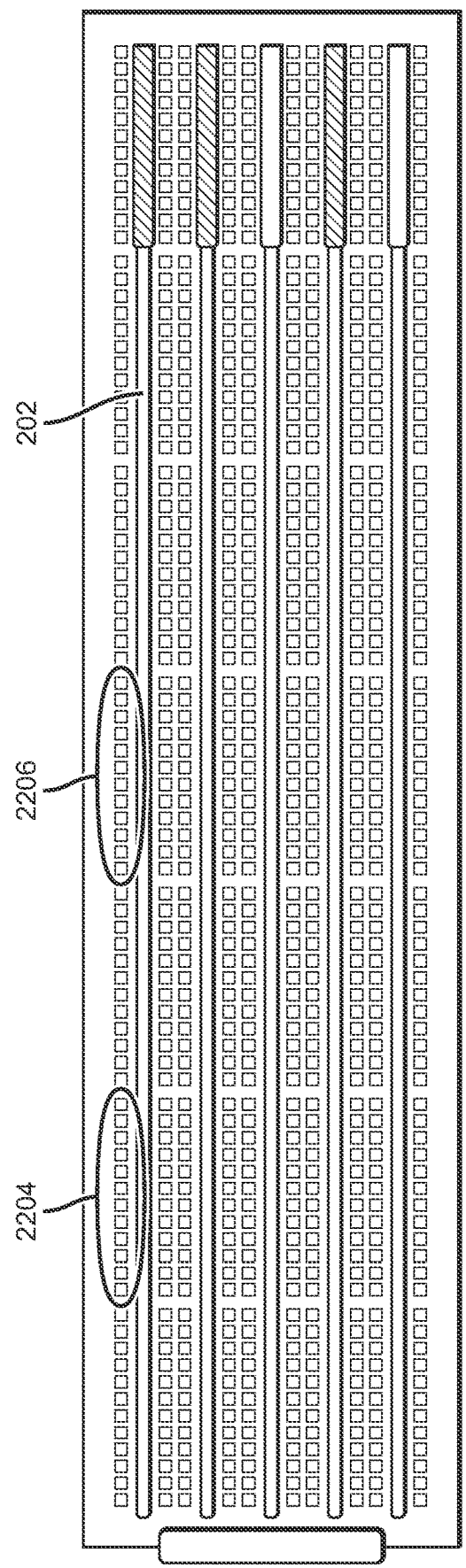
FIG. 22 illustrates a top view of the lighting assembly for a number of grow lines of receptacle supports (e.g., towers), according to embodiments of the disclosure.

FIG. 22 illustrates a top view of the lighting assembly for a number of grow lines of receptacle supports (e.g., towers), according to embodiments of the disclosure. The figure shows five grow lines 202 horizontally. According to embodiments of the disclosure, linear arrays of lights are disposed on each side of a grow line 202. According to embodiments of the disclosure, the lights shine down from above the receptacle supports to illuminate the plants growing out of the sides of the receptacle supports. As shown, the lights may be grouped into sections (e.g., sections 2204, 2206).

Figure 23:
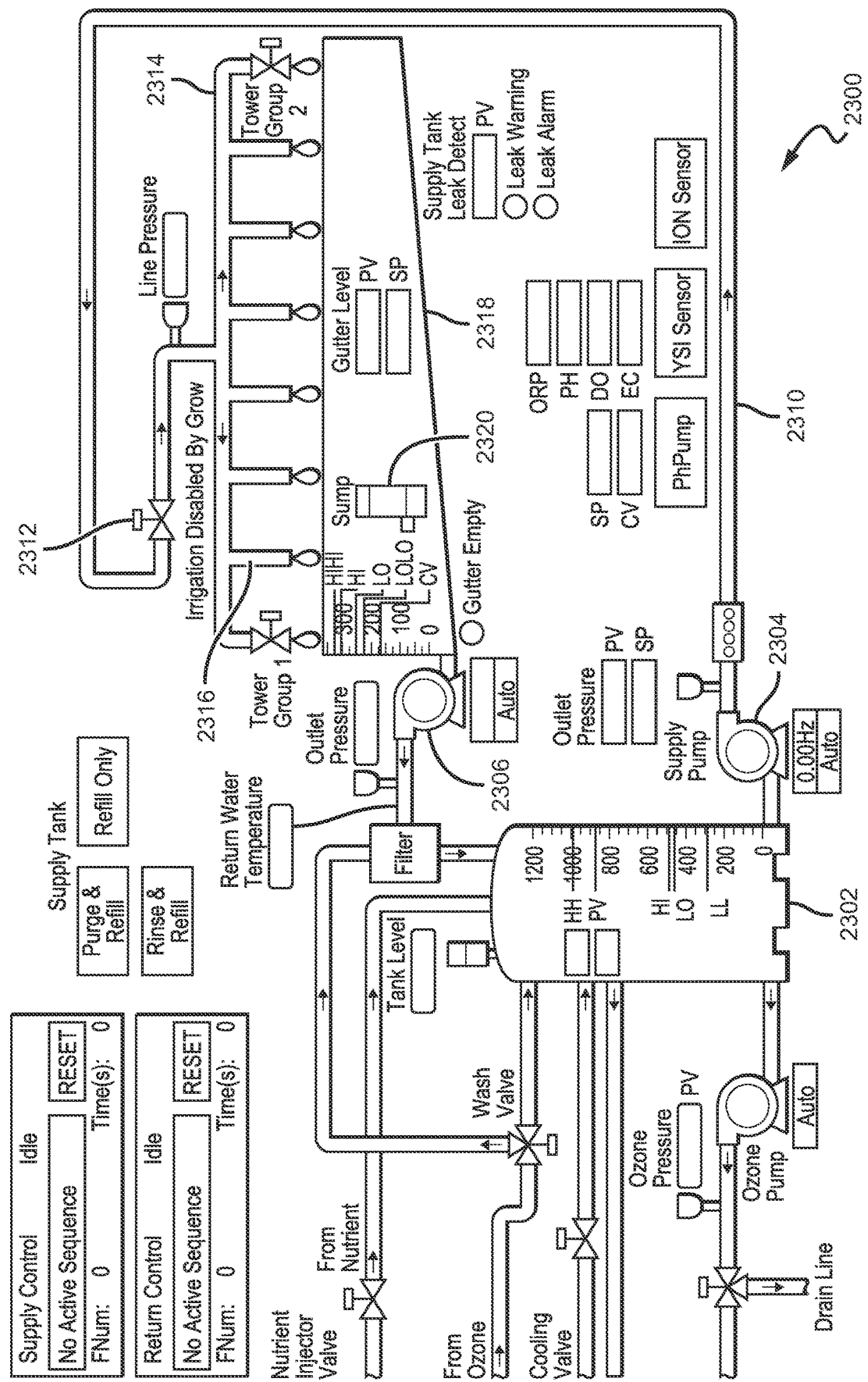
FIG. 23 illustrates an irrigation subsystem according to embodiments of the disclosure.

FIG. 23 illustrates an irrigation subsystem 2300 according to embodiments of the disclosure, including a water supply tank 2302, a supply pump 2304, a return pump 2306, a flow sensor, a supply line 2310, a zone master valve 2312, a lateral, main irrigation line 2314 from which branch irrigation lines 2316 branch off (shown for eight grow room sections), and a gutter 2318. The main irrigation line 2314 runs parallel to and above the grow line of vertical receptacle supports (e.g., towers). A nozzle at the end of each branch irrigation line 2316 allows water to spray down into a funnel disposed at the top of the vertical receptacle support, thus enabling irrigation of the plants supported by the receptacle support, according to embodiments of the disclosure. The gutter 2318 includes a gutter water level sensor and a sump pump 2320.

In operation, the supply pump 2320 pumps nutrient-enriched water from the supply tank 2302 through the supply line 2310 to the branch irrigation lines 2316 via the main irrigation line 2314. The water flows from the nozzles into the receptacle supports. Any water not retained in the receptacle supports flows into the gutter 2318.

The flow sensor monitors flow rate in the supply line 2310. The supply pump 2304, like many commercial supply pumps, provides an error signal in case of a pump malfunction. In response to an irrigation fault condition (e.g., the error signal or the flow rate falling below a desired threshold (e.g., 200 liters per minute)), the controller 203 executes an irrigation fail safe protocol, as follows according to embodiments of the disclosure: dim the lights (e.g., down to 10% of standard illumination) if the irrigation fault condition persists for a given time period, e.g., 10 minutes; turn off the lights if the irrigation fault condition persists for a further time period, e.g., 30 minutes more. According to embodiments of the disclosure, if the fault condition ends, the controller 203 turns the lights back on.

Flow Sensor

Figure 24:
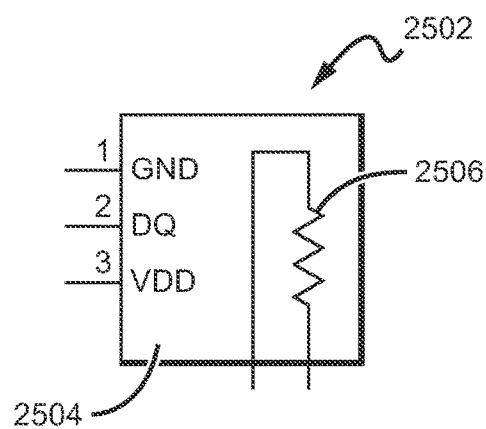
FIG. 24 illustrates a flow sensor according to embodiments of the disclosure.

FIG. 24 illustrates a flow sensor element 2502 according to embodiments of the disclosure. The flow sensor element 2502 includes a digital thermometer 2504 thermally coupled to a heating element 2506.

Figure 25A:
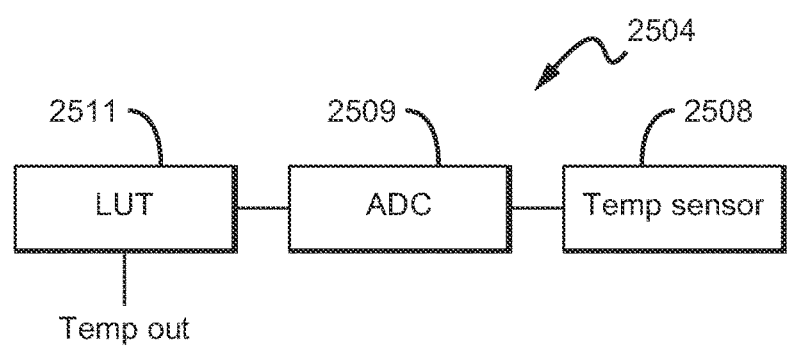
FIGS. 25A and 25B illustrate digital thermometers, according to embodiments of the disclosure.

FIG. 25A is a simplified block diagram of a digital thermometer 2504, according to embodiments of the disclosure. The digital thermometer 2504 may include a temperature sensor 2508, such as a thermistor circuit. Resistance of the thermistor varies with temperature. The thermistor circuit may include a thermistor in a half-bridge configuration (e.g., with a resistor divider), so that voltage represents the resistance of the thermistor. According to embodiments of the disclosure, the digital thermometer 2504 includes an analog-to-digital converter ("ADC") 2509 to convert the output of the temperature sensor 2508 into a digital value. According to embodiments of the disclosure, logic (not shown) in the digital thermometer 2504 applies an equation to the output of the ADC to determine the temperature, according to known techniques. In other embodiments, the digital thermometer 2504 employs a look-up table 2511 to convert the ADC output into a temperature value. For background on measuring temperature with a thermistor, please see Application Note 1753, A Simple Thermistor Interface to an ADC, 26 Nov. 2002, MAXIM INTEGRATED PRODUCTS, INC., incorporated by reference herein in its entirety.

Figure 25B:
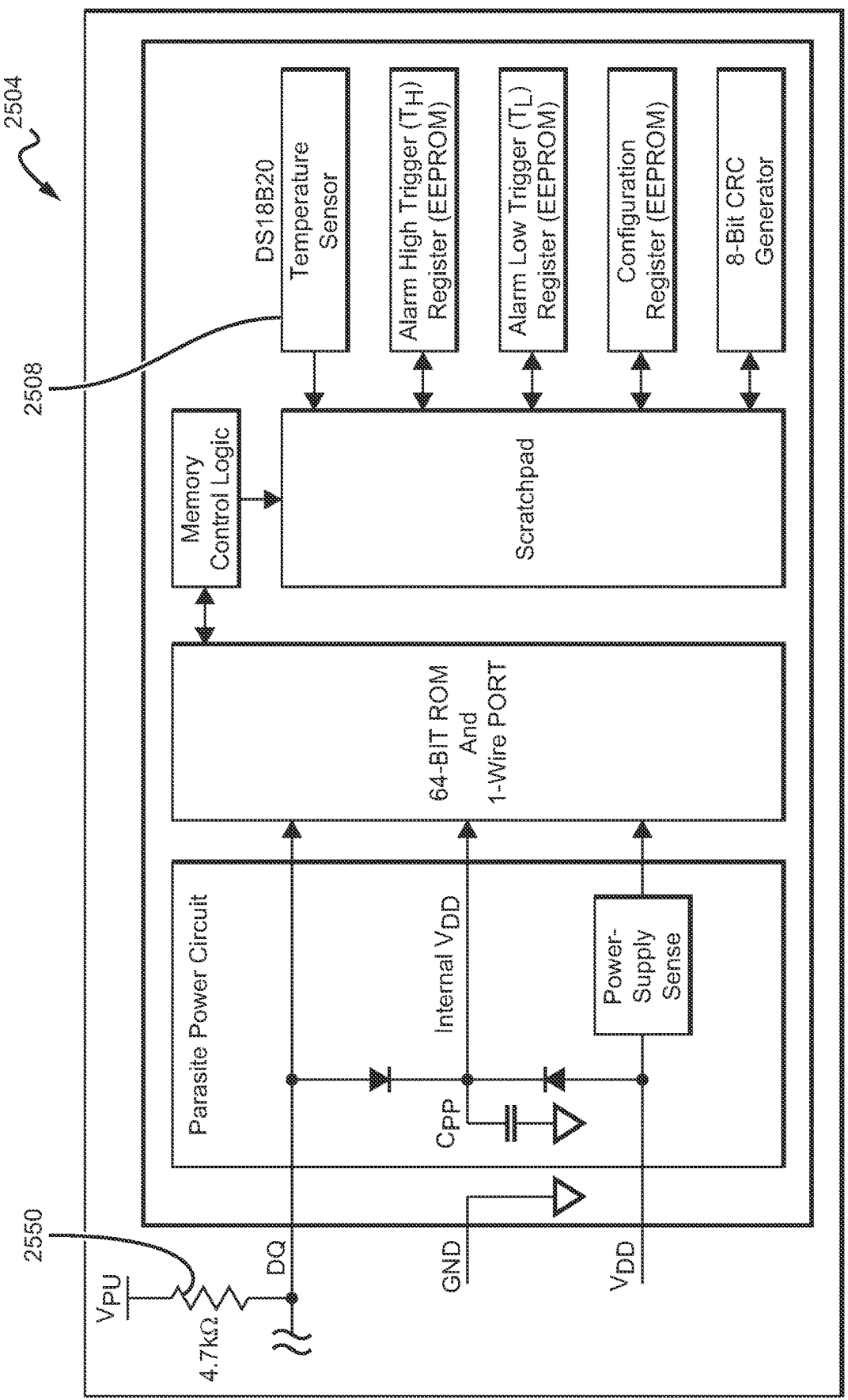

FIG. 25B is a block diagram of a DS18B20 programmable 1-WIRE digital thermometer manufactured by Maxim Integrated Products, Inc. According to embodiments of the disclosure, the digital thermometer 2504 comprises the DS18B20 thermometer. The *DS18B20 Programmable Resolution 1-WIRE Digital Thermometer Datasheet,* 19-7487; Rev 6; July 2019, MAXIM INTEGRATED PRODUCTS, INC., is incorporated by reference herein in its entirety.

Referring back to FIG. 24, the heating element 2506 may comprise any material that experiences ohmic heating, such as a carbon resistor, a nichrome wire, a plate (e.g., of dimensions coextensive with, or smaller than, those of one side of the digital thermometer 2504 packaging), a spiral wrapped around the digital thermometer 2504, or a tube enclosing the digital thermometer 2504.

According to embodiments of the disclosure, the thermometer 2504 and the heating element 2506 may be thermally coupled by placing them against each other and potting them together with a potting compound such as epoxy resin, silicone, or urethane.

Figure 26:
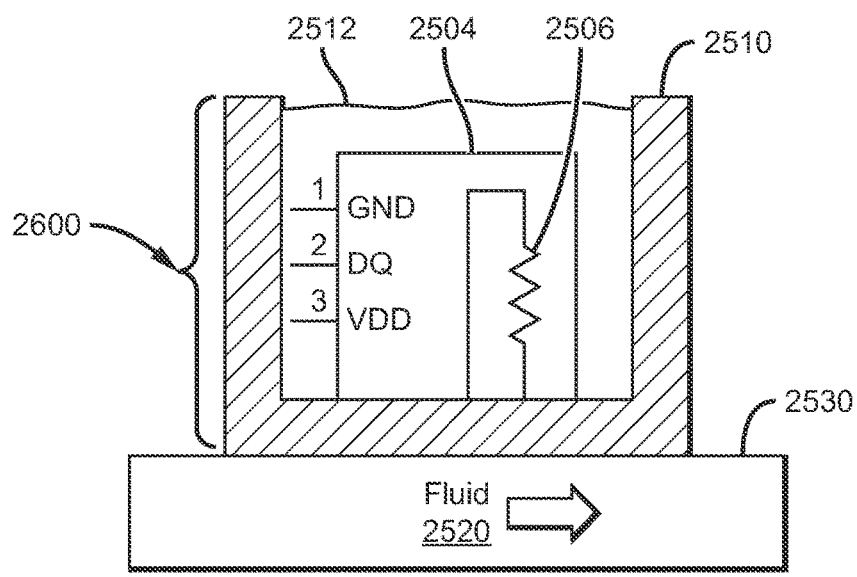
FIG. 26 illustrates a flow sensor assembly thermally coupled to a fluid channel, according to embodiments of the disclosure.

FIG. 26 illustrates a flow sensor assembly 2600, according to embodiments of the disclosure. The flow sensor assembly 2600 may be placed at any location where fluid flows in the controlled agricultural environment of embodiments of the disclosure, including nozzles 1602. According to embodiments of the disclosure, the flow sensor assembly 2600 includes digital thermometer 2504 and heating element 2506 of flow sensor element 2502, and a thermally conductive element 2510, which are all thermally coupled to each other. The components may be thermally coupled together with a potting compound 2512, such as epoxy resin, silicone, or urethane. According to embodiments of the disclosure, the thermally conductive element 2510 may comprise a thermally conductive cup in which the thermometer 2504 and the heating element 2506 reside, or a plate or other shape for thermally coupling the flow sensor element 2502 to a fluid 2520 in a fluid channel 2530. The thermally conductive material may comprise titanium or stainless steel, for example.

According to embodiments of the disclosure, the thermally conductive element 2510 is placed against a flowing fluid 2520 (e.g., nutrient solution) having a flow rate to be measured. According to embodiments of the disclosure, the fluid 2520 may reside in a fluid channel 2530, with the thermally conductive element 2510 in direct contact with the fluid 2520, e.g., via an opening in the fluid channel 2530.

An advantage of flow sensor assembly 2600 over conventional approaches is that no electrical current flows through the thermally conductive element 2510. Thus, the thermally conductive element 2510 may employ more fluid-compatible materials than those used for heating element 2506 (through which current flows to actively heat heating element 2506), including fluid-compatible materials that are more resistant to corrosion and erosion than heating element materials (e.g., nichrome) that efficiently generate heat when current is applied. Such fluid-compatible materials that would be suitable for thermal conduction, but not suitable for heating elements include, for example, titanium, stainless steel, and thermally conductive ceramics. According to embodiments of the disclosure, the thermally conductive element 2510 employs materials having the following characteristics: high thermal conductivity (e.g., greater than 5 W/mK), bondability to a polymer enclosure such as a PVC water nozzle or conduit, whereas the heating element 2506 employs materials that have a relatively linear resistance temperature coefficient and resilience to many thermal cycles.

Figure 27:
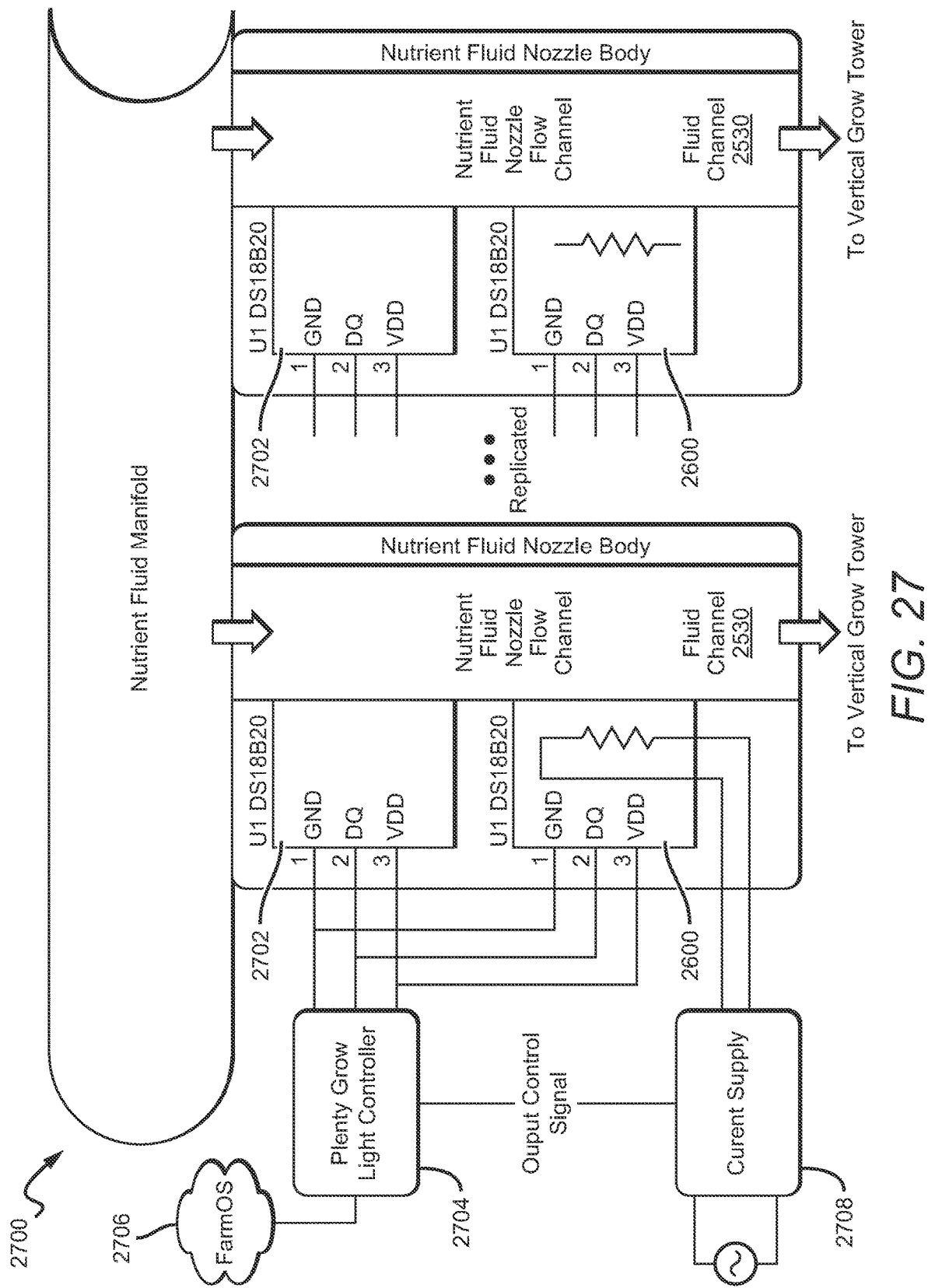
FIG. 27 illustrates a flow sensor network, according to embodiments of the disclosure.

FIG. 27 illustrates a network 2700 of flow sensor assemblies 2600 according to embodiments of the disclosure. According to embodiments of the disclosure, to determine flow within a fluid channel 2530, a flow sensor assembly 2600 and a second digital thermometer 2702 (e.g., a DS18B20 digital thermometer chip) are thermally coupled to a flow channel (i.e., fluid channel) 2530 with the flow sensor assembly 2600 disposed downstream of the second digital thermometer 2702 with respect to the flow direction. The distance between the flow sensor assembly 2600 and the second digital thermometer 2702 may be any length that enables measurement by the second digital thermometer 2702 of the upstream temperature of the fluid in the channel 2530, e.g., a few millimeters. According to embodiments of the disclosure, the flow sensor assembly 2600 and the second digital thermometer 2702 are so small compared to the channel 2530 that effectively the entire chip is thermally coupled to the flow channel 2530.

The second digital thermometer 2702 may be separated from the flowing medium (e.g., nutrient solution, water) by a thermally conductive element, such as thermally conductive element 2510 used for flow sensor assembly 2600. The flow sensor assembly 2600 and the second digital thermometer 2702 provide first and second outputs that represent measured temperature at their respective locations.

According to embodiments of the disclosure, a microprocessor, microcontroller (e.g., Arduino-compatible) or other logic provides a flow measurement based at least in part upon the first and second outputs. The logic may be incorporated into or separate from controller 203. The controller may be the same controller 2704 used to control grow lights and may itself be responsive to instructions from a higher-level "Farm OS" controller 2706 that controls operations of the entire controlled agricultural environment.

The combination of a flow sensor element (thermometer+heater) 2502 and the second digital thermometer 2702 may be referred to herein as a "differential flow sensor" to distinguished it from the flow sensor element 2502 itself. In practice, the flow sensor element 2502 and the second digital thermometer 2702 of the differential flow sensor may each be thermally coupled to the flowing fluid via respective thermally conductive elements, as described above. The differential flow sensor may be placed at any location in the controlled agricultural environment of embodiments of the disclosure, including nozzles 1602. A single differential flow sensor in combination with a controller or other logic may be referred to herein as a "flow meter."

According to embodiments of the disclosure with reference to FIG. 27, to form a sensor network of differential flow sensors, multiple differential flow sensors may be daisy chained, with the data (DQ) lines of all the flow sensor elements 2502 of the flow sensor assemblies 2600 and of all the second digital thermometers 2702 of all the differential flow sensors tied together. Also, the power lines to all the heating elements of each integrated flow sensor may be tied together to draw power from the same source, e.g., constant-current power supply 2708.

Of course, all the differential flow sensors may be grounded to the same ground. Also, if the digital thermometers within the differential flow sensors are not running on parasite power, all the $V_{DD}$ power lines may be tied together to draw power from the same source. When operating in parasite power mode, the digital thermometer 2504 derives power directly from the data line instead of from an external supply. Power is instead supplied using a pullup resistor 2550 on the DQ pin when the bus is high. The high bus signal also charges an internal capacitor ($C_{PP}$), which then supplies power to the device when the bus is low. This method of deriving power from the single-wire bus is referred to as "parasite power."

According to embodiments of the disclosure, the controller 2704 communicates with the differential flow sensors over the single data line ("single wire"). According to embodiments of the disclosure, the controller 2704 may communicate commands and data with the different differential flow sensors in a time-multiplexed manner over the data line, as described in *DS18B20, Programmable Resolution 1-Wire Digital Thermometer, Datasheet*, Maxim Integrated Products, Inc. 19-7487; Rev 6; July 2019 (2019), incorporated by reference herein in its entirety. The controller 2704 may query each differential flow sensor for its measured temperature using an address identifying the queried differential sensor.

According to embodiments of the disclosure, the controller 2704 determines the velocity of fluid (flow rate) flowing through the fluid channel 2530 with a differential flow sensor that generates heat Q, using a convection heat loss equation such as:

$$Q = hA(T_{heater} - T_{water}).$$

$T_{heater}$ is the temperature measured by the flow sensor 2502, and $T_{water}$ is the temperature measured by the upstream second digital thermometer 2702.

A is defined as the heat emitting area of a thermally conductive element 2510 that is thermally coupled to the flowing fluid 2520 (e.g., a flat plate, or the area of thermally conductive element 2510 that abuts channel 2530) and h is the coefficient of convection from the equation below for the thermally conductive element 2510

$$h = \frac{Nu*k}{L}.$$

For a nutrient nozzle according to embodiments of the disclosure, flow is determined to be laminar because the Reynolds number (Re) is calculated to be 180 which is less than the critical transition Reynolds number of $5*10^5$ as found using the equation:

$$Re = \frac{V*x}{v}$$

where V is the expected maximum velocity of the fluid, x is the traveled length of the fluid within the nozzle (e.g., length of the nozzle flow channel) and v is the kinematic viscosity of the fluid. If the maximum expected velocity of an unclogged nozzle results in laminar flow, then any lower velocity from a clogged or nozzle will still result in laminar flow and thus the equation for the Reynolds number may be used to determine velocity of the fluid.

Getting back to the equation for h, for a flat surface like that of element 2510 abutting the fluid channel 2530 which contains laminar flow, $$Nu = \frac{h*L}{k} 0.644 Re_L^{1/2} - Pr^{1/3}$$

where L is the length of the flat surface, k is the thermal conductivity of the fluid, Nu is the Nusselt number, and Pr is the Prandtl number, which is a measure of the relative thickness of the velocity and thermal boundary layer given by the equation:

$$Pr = \frac{\mu * C_p}{k}.$$

In that equation, $\mu$ is the dynamic viscosity of the fluid, $C_p$ is the specific heat capacity of the fluid and k was defined earlier. All fluid properties are evaluated at the "film temperature $T_{film}$," which is the temperature of the fluid adjacent to the thermally conductive element 2510, which is $$T_{film} = \frac{T_{heater} + T_{water}}{2}.$$

Putting this all together and solving for the velocity of the fluid gives the equation:

$$V = \frac{v}{x} * \left( \frac{L \times Q}{0.664 * Pr^{1/3} * A * (T_{heater} - T_{water})} \right)^2$$

Based on the fluid velocity (flow rate), the controller 2704 may determine whether the flow rate falls below a threshold value that indicates a blockage in the flow channel. Normal flow rate measured in a nozzle above a tower funnel may be, for example, 0.04 liters per second. Thus, the controller may provide an alert of a potential obstruction at a measured rate below the threshold, such as 0.03 liters per second.

Note that, unlike a conventional CTA, in the flow sensor 2502 the heating element 2506 is not part of a Wheatstone bridge circuit. The logic (e.g., in the controller 2704) does not perform analog-to-digital conversion on voltage of a Wheatstone bridge that includes the heating element. Moreover, the first digital thermometer 2504 includes a temperature sensor component 2508 that is not actively heated (current is applied to temperature sensor component 2508 to measure, but not to generate heat).

Computer System Implementation

Figure 20:
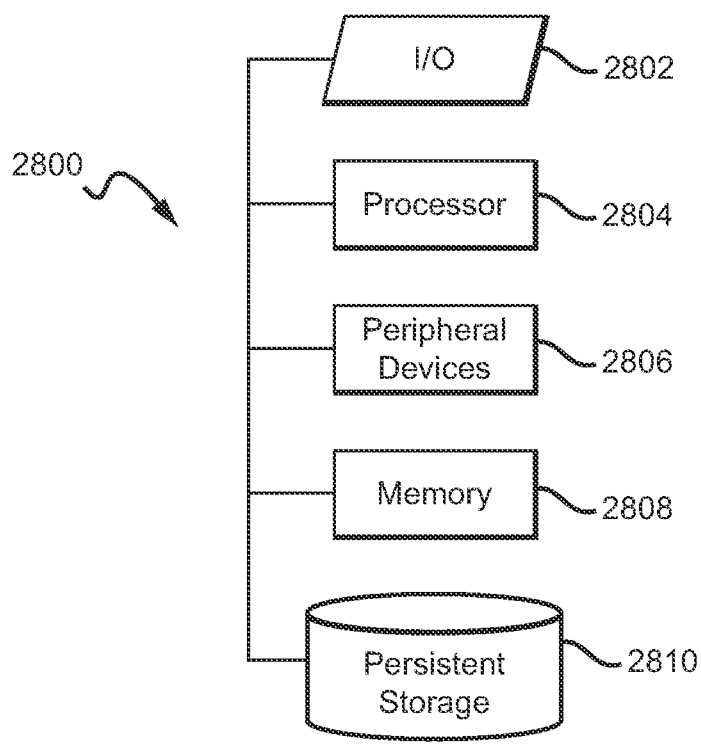
FIG. 20 illustrates an example of a computer system that may be used to execute instructions stored in a non-transitory computer readable medium (e.g., memory) in accordance with embodiments of the disclosure.

FIG. 20 illustrates an example of a computer system 2800 that may be used to execute program code stored in a non-transitory computer readable medium (e.g., memory) in accordance with embodiments of the disclosure. The computer system includes an input/output subsystem 2802, which may be used to interface with human users or other computer systems depending upon the application. The I/O subsystem 2802 may include, e.g., a keyboard, mouse, graphical user interface, touchscreen, or other interfaces for input, and, e.g., an LED or other flat screen display, or other interfaces for output, including application program interfaces (APIs). Other elements of embodiments of the disclosure, such as engine 106, control system 107, and controller 203, may be implemented with a computer system like that of computer system 2800.

Program code may be stored in non-transitory media such as persistent storage in secondary memory 2810 or main memory 2808 or both. Main memory 2808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 2804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 2804. The processor(s) 2804 may include graphics processing units (GPUs) for handling computationally intensive tasks.

The processor(s) 2804 may communicate with external networks via one or more communications interfaces 2807, such as a network interface card, WiFi transceiver, etc. A bus 2805 communicatively couples the I/O subsystem 2802, the processor(s) 2804, peripheral devices 2806, communications interfaces 2807, memory 2808, and persistent storage 2810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 2800. In particular, the elements of automated systems or devices described herein may be computer-implemented. Some elements and functionality may be implemented locally and others may be implemented in a distributed fashion over a network through different servers, e.g., in client-server fashion, for example.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

All references cited herein, including, without limitation, articles, publications, patents, patent publications, and patent applications, are incorporated by reference in their entireties for all purposes, except that any portion of any such reference is not incorporated by reference herein to the extent it: (1) is inconsistent with embodiments of the disclosure expressly described herein; (2) limits the scope of any embodiments described herein; or (3) limits the scope of any terms of any claims recited herein. Mention of any reference, article, publication, patent, patent publication, or patent application cited herein is not, and should not be taken as an acknowledgment or any form of suggestion that it constitutes valid prior art or forms part of the common general knowledge in any country in the world, or that it discloses essential matter.

EMBODIMENTS OF THE DISCLOSURE

The following are some exemplary embodiments of the disclosure:
1. A digital flow sensor comprising:
   a flow sensor element comprising a first digital thermometer for providing a first output and a heating element thermally coupled to the first digital thermometer.
2. The flow sensor of embodiment 1, further comprising:
   a second digital thermometer for providing a second output;
   logic for providing a flow measurement based at least in part upon the first and second outputs.
3. The flow sensor of embodiment 2, wherein the logic is operable to provide the flow measurement in response to the flow sensor element and the second digital thermometer being thermally coupled to a flowing fluid.
4. The flow sensor of any one of the preceding embodiments, further comprising a thermally conductive element thermally coupled to the flow sensor element.
5. The flow sensor of embodiment 4, wherein the thermally conductive element is disposed in a wall of a fluid channel to enable thermal coupling to a flowing fluid in the channel.
6. The flow sensor of any one of the preceding embodiments starting with embodiment 4, wherein at least one of the thermally conductive element or the heating element has a thermal conductivity of at least 5 W/mK.
7. The flow sensor of any one of the preceding embodiments, wherein the flow sensor element includes a single-wire bus for communicating data and commands.
8. The flow sensor of any one of the preceding embodiments, wherein the flow sensor element includes a single-wire bus for communicating data and commands, and for receiving power.
9. The flow sensor of any one of the preceding embodiments, wherein the heating element is not part of a Wheatstone bridge circuit.
10. The flow sensor of any one of the preceding embodiments, wherein the logic does not perform analog-to-digital conversion on voltage of a Wheatstone bridge that includes the heating element.
11. The flow sensor of any one of the preceding embodiments, wherein the first digital thermometer includes an integrated temperature sensor component that is not thermally coupled to a heating element within the first digital thermometer.
12. The flow sensor of any one of the preceding embodiments, wherein the first digital thermometer includes no moving parts.
13. A flow sensor network comprising a plurality of digital flow sensors of any one of the preceding embodiments, wherein data lines of the plurality of digital flow sensors are coupled to the same network bus for communicating data.
14. The flow sensor network of embodiment 13, wherein commands are also communicated over the network bus.
15. The flow sensor network of any one of the preceding embodiments starting with embodiment 13, wherein the network bus is a single-wire bus.
16. The flow sensor network of any one of the preceding embodiments starting with claim 13, wherein the heating elements of the plurality of digital flow sensors are coupled to the same current source.

What is claimed is:
1. A digital flow sensor comprising:
   a flow sensor element comprising a first digital thermometer, for providing a first output, and a heating element thermally coupled to the first digital thermometer; and
   a second digital thermometer for providing a second output,
   wherein the flow sensor element is disposed downstream of the second digital thermometer with respect to a direction of flow of a flowing fluid.
2. The flow sensor of claim 1, further comprising:
   logic for providing a flow measurement based at least in part upon the first and second outputs.
3. The flow sensor of claim 2, wherein the logic is operable to provide the flow measurement in response to the flow sensor element and the second digital thermometer being thermally coupled to the flowing fluid.
4. The flow sensor of claim 2, wherein the logic does not perform analog-to-digital conversion on voltage of a Wheatstone bridge that includes the heating element.
5. The flow sensor of claim 1, further comprising a thermally conductive element thermally coupled to the flow sensor element, wherein the thermally conductive element is positioned to block the heating element from physical contact with the flowing fluid or with a fluid channel through which the flowing fluid flows.
6. The flow sensor of claim 5, wherein the thermally conductive element is disposed in a wall of the fluid channel to enable thermal coupling to the flowing fluid in the channel.
7. The flow sensor of claim 5, wherein at least one of the thermally conductive element or the heating element has a thermal conductivity of at least 5 W/mK.
8. The flow sensor of claim 1, wherein the flow sensor element includes a single-wire bus for communicating data and commands.
9. The flow sensor of claim 1, wherein the flow sensor element includes a single-wire bus for communicating data and commands, and for receiving power.
10. The flow sensor of claim 1, wherein the heating element is not part of a Wheatstone bridge circuit.

11. The flow sensor of claim 1, wherein the first digital thermometer includes an integrated temperature sensor component that is not thermally coupled to a heating element within the first digital thermometer.

12. The flow sensor of claim 1, wherein the first digital thermometer includes no moving parts.

13. A flow sensor network comprising a plurality of digital flow sensors of claim 1, wherein data lines of the plurality of digital flow sensors are coupled to the same network bus for communicating data.

14. The flow sensor network of claim 13, wherein commands are also communicated over the network bus.

15. The flow sensor network of claim 13, wherein the network bus is a single-wire bus.

16. The flow sensor network of claim 13, wherein the heating elements of the plurality of digital flow sensors are coupled to the same current source.

17. A method of sensing flow comprising:
providing a first output from a flow sensor element comprising a first digital thermometer and a heating element;
thermally coupling the heating element to the first digital thermometer; and
providing a second output from a second digital thermometer,
wherein the flow sensor element is disposed downstream of the second digital thermometer with respect to a direction of flow of a flowing fluid.

18. The method of claim 17, further comprising:
providing a flow measurement based at least in part upon the first and second outputs.

19. The method of claim 18, wherein providing the flow measurement comprises providing the flow measurement in response to the flow sensor element and the second digital thermometer being thermally coupled to the flowing fluid.

20. The method of claim 17, further comprising thermally coupling a thermally conductive element to the flow sensor element, wherein the thermally conductive element is positioned to block the heating element from physical contact with the flowing fluid or with a fluid channel through which the flowing fluid flows.

21. The method of claim 20, further comprising disposing the thermally conductive element in a wall of a fluid channel to enable thermal coupling to the flowing fluid in the channel.

22. The method of claim 20, wherein at least one of the thermally conductive element or the heating element has a thermal conductivity of at least 5 W/mK.

23. The method of claim 18, wherein providing a flow measurement does not comprise performing analog-to-digital conversion on voltage of a Wheatstone bridge that includes the heating element.

24. The method of claim 17, wherein the flow sensor element includes a single-wire bus for communicating data and commands.

25. The method of claim 17, wherein the flow sensor element includes a single-wire bus for communicating data and commands, and for receiving power.

26. The method of claim 17, wherein the heating element is not part of a Wheatstone bridge circuit.

27. The method of claim 17, wherein the first digital thermometer includes an integrated temperature sensor component that is not thermally coupled to a heating element within the first digital thermometer.

28. The method of claim 17, wherein the first digital thermometer includes no moving parts.

29. A method comprising coupling data lines of a plurality of digital flow sensors to a network bus, each digital flow sensor comprising a flow sensor element and a heating element of claim 17.

30. The method of claim 29, wherein the network bus is a single-wire bus.

31. The method of claim 29, further comprising coupling the heating elements of the plurality of digital flow sensors to the same current source.

* * * * *